United States Patent
Rudisill et al.

(10) Patent No.: US 9,583,871 B1
(45) Date of Patent: *Feb. 28, 2017

(54) ELECTRICAL CONNECTOR SYSTEM WITH FERROMAGNETIC ACTUATORS

(71) Applicants: Charles Albert Rudisill, Apex, NC (US); Daniel John Whittle, Bellingham, WA (US)

(72) Inventors: Charles Albert Rudisill, Apex, NC (US); Daniel John Whittle, Bellingham, WA (US)

(73) Assignee: APEX TECHNOLOGIES, INC., Apex, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,605

(22) Filed: Jan. 29, 2016

Related U.S. Application Data

(63) Continuation of application No. 13/910,132, filed on Jun. 5, 2013, now Pat. No. 9,300,081, and a
(Continued)

(51) Int. Cl.
*H01R 11/30* (2006.01)
*H01R 13/62* (2006.01)
*H01R 13/645* (2006.01)

(52) U.S. Cl.
CPC ....... *H01R 13/6205* (2013.01); *H01R 13/645* (2013.01)

(58) Field of Classification Search
CPC .................................................. H01R 13/6205
(Continued)

(56) References Cited

U.S. PATENT DOCUMENTS 3,363,214 A   1/1968   Wright
3,431,428 A   3/1969   Van Valer
(Continued)

FOREIGN PATENT DOCUMENTS

DE   10333403 A1   9/2004
JP   2006095040 A   4/2006
(Continued)

*Primary Examiner* — Neil Abrams
(74) *Attorney, Agent, or Firm* — Daniel J. Whittle

(57) ABSTRACT

Disclosed are interposer electrical connector embodiments including magnetic components used to facilitate interconnection of peripheral devices to standard input/output, or "I/O", connectors (such as USB connectors) of devices such as mobile communications products (e.g. smart phones, tablets, and personal computers). The interposer connector embodiments disclosed include those in which a plurality of discrete permanent magnets are arranged with magnetic poles aligned in the same orientation perpendicular to and on one side of the electrical interface. Other embodiments include a plurality of bar permanent magnets located on opposite sides of the interface with all poles of the same type directed at the interface, but each one opposing a ferromagnetic element. These arrangements provide self-aligning capabilities useful for electrical connections that have restrictions on visibility or connection approach geometries. Other embodiments have a single magnet per mated connector pair and magnetic pole pieces and/or actuators to concentrate magnetic flux providing the magnetic attractive force for a plurality of electrical connections.

20 Claims, 12 Drawing Sheets

Related U.S. Application Data continuation-in-part of application No. 13/105,091, filed on May 11, 2011, now abandoned.

(60) Provisional application No. 61/786,037, filed on Mar. 14, 2013, provisional application No. 61/655,483, filed on Jun. 5, 2012, provisional application No. 61/395,479, filed on May 13, 2010.

(58) Field of Classification Search
USPC .......................................................... 439/39
See application file for complete search history.

(56) References Cited

U.S. PATENT DOCUMENTS

| | | | |
|---|---|---|---|
| 3,521,216 A | 7/1970 | Tolegian | |
| 3,713,370 A | 1/1973 | Prijn | |
| 3,750,083 A | 7/1973 | Fayling | |
| 3,786,391 A | 1/1974 | Mathauser | |
| 3,808,577 A | 4/1974 | Mathauser | |
| 3,810,258 A | 5/1974 | Mathauser | |
| 3,868,160 A | 2/1975 | Kersman | |
| 4,067,342 A | 1/1978 | Burton | |
| 4,451,113 A | 5/1984 | Zuniga | |
| 4,479,685 A | 10/1984 | Kirby | |
| 4,871,315 A * | 10/1989 | Noschese | H01R 12/79 439/329 |
| 4,874,316 A | 10/1989 | Kamon et al. | |
| 5,248,261 A * | 9/1993 | Conroy-Wass | G01R 1/0416 439/289 |
| 5,401,175 A | 3/1995 | Guimond et al. | |
| 5,829,987 A | 11/1998 | Fritsch et al. | |
| 5,921,783 A | 7/1999 | Fritsch et al. | |
| 5,941,714 A | 8/1999 | Gorbet et al. | |
| 5,941,729 A | 8/1999 | Sri-Jayantha | |
| 6,015,081 A | 1/2000 | Okabayashi et al. | |
| 6,069,545 A | 5/2000 | Van Zeeland | |
| 6,129,559 A | 10/2000 | Hirata et al. | |
| 6,213,783 B1 * | 4/2001 | Kankkunen | H01R 13/6205 439/39 |
| 6,461,192 B1 | 10/2002 | Kwoka | |
| 6,464,509 B1 | 10/2002 | Emberty et al. | |
| 6,527,560 B2 | 3/2003 | Yang | |
| 6,561,815 B1 | 5/2003 | Schmidt | |
| 6,565,363 B2 | 5/2003 | Downing | |
| 6,575,764 B1 * | 6/2003 | Reipur | H01R 13/24 439/289 |
| 6,607,391 B2 | 8/2003 | Mendelson et al. | |
| 6,821,126 B2 | 11/2004 | Neidlein | |
| 6,966,781 B1 | 11/2005 | Bullinger et al. | |
| 6,988,897 B2 | 1/2006 | Belongia et al. | |
| 7,066,739 B2 | 6/2006 | McLeish | |
| 7,097,461 B2 | 8/2006 | Neidlein | |
| 7,252,512 B2 * | 8/2007 | Tai | H01R 13/6205 439/39 |
| 7,264,479 B1 | 9/2007 | Lee | |
| 7,311,526 B2 | 12/2007 | Rohrbach et al. | |
| 7,322,873 B2 | 1/2008 | Rosen et al. | |
| 7,331,793 B2 | 2/2008 | Hernandez et al. | |
| 7,344,380 B2 | 3/2008 | Neidlein et al. | |
| 7,351,066 B2 | 4/2008 | DiFonzo et al. | |
| 7,364,433 B2 | 4/2008 | Neidlein | |
| 7,378,834 B2 | 5/2008 | Hofmeister et al. | |
| 7,467,948 B2 | 12/2008 | Lindberg et al. | |
| 7,517,222 B2 | 4/2009 | Rohrbach et al. | |
| 7,627,343 B2 | 12/2009 | Fadell et al. | |
| 7,688,580 B2 | 3/2010 | Richardson et al. | |
| 7,762,817 B2 | 7/2010 | Ligtenberg et al. | |
| 7,771,202 B2 * | 8/2010 | Amotz | H01R 9/28 439/39 |
| 7,775,801 B2 | 8/2010 | Shiff et al. | |
| 7,834,729 B2 | 11/2010 | Fullerton et al. | |
| 7,846,002 B1 | 12/2010 | Mikesell et al. | |
| 7,874,844 B1 | 1/2011 | Fitts | |
| 8,087,939 B2 | 1/2012 | Rohrbach et al. | |
| 8,187,006 B2 * | 5/2012 | Rudisill | H01R 11/30 362/249.06 |
| 8,491,312 B2 | 7/2013 | Rudisill et al. | |
| 8,608,502 B2 | 12/2013 | Witter et al. | |
| 9,300,081 B2 * | 3/2016 | Rudisill | H01R 13/6205 |
| 2004/0209489 A1 | 10/2004 | Clapper | |
| 2004/0224539 A1 | 11/2004 | Boyd et al. | |
| 2007/0093279 A1 | 4/2007 | Janik | |
| 2007/0254510 A1 | 11/2007 | DeBey | |
| 2008/0166007 A1 | 7/2008 | Hankey et al. | |
| 2009/0034209 A1 | 2/2009 | Joo et al. | |
| 2009/0251263 A1 | 10/2009 | Fullerton et al. | |
| 2009/0251372 A1 | 10/2009 | Degner et al. | |
| 2009/0284336 A1 | 11/2009 | Fullerton et al. | |
| 2010/0254111 A1 | 10/2010 | Ligtenberg et al. | |
| 2010/0261366 A1 | 10/2010 | Peiker | |
| 2011/0121145 A1 | 5/2011 | Mihajlovic | |
| 2012/0021618 A1 | 1/2012 | Schultz | |
| 2012/0021619 A1 | 1/2012 | Bilbrey et al. | |
| 2012/0023597 A1 | 1/2012 | Bilbrey et al. | |
| 2012/0028480 A1 | 2/2012 | Bilbrey et al. | |
| 2012/0032765 A1 | 2/2012 | Bilbrey et al. | |
| 2013/0044501 A1 | 2/2013 | Rudisill et al. | |

FOREIGN PATENT DOCUMENTS

| | | |
|---|---|---|
| JP | 2008236073 A | 10/2008 |
| WO | 03090321 A1 | 10/2003 |

* cited by examiner

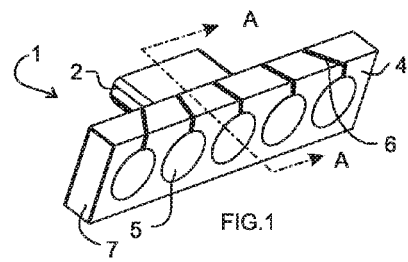
FIG.1
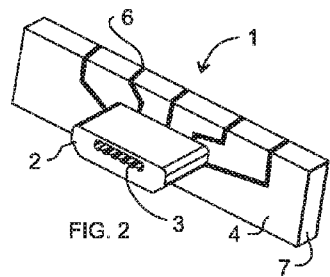
FIG.2
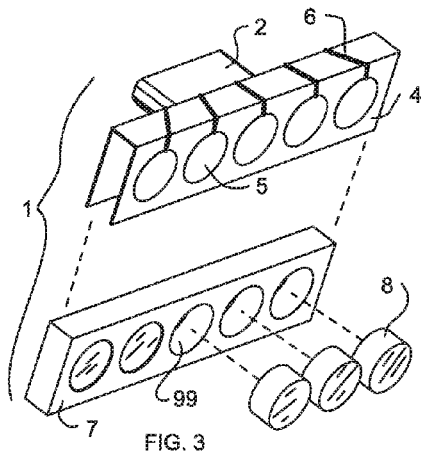
FIG.3
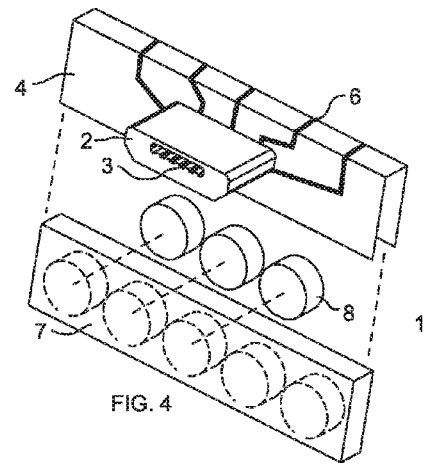
FIG.4
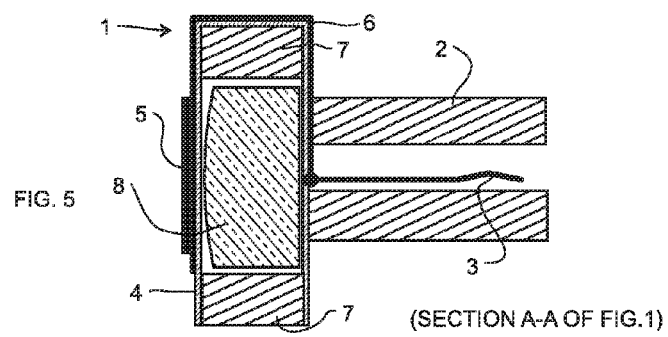
FIG.5 (SECTION A-A OF FIG.1)
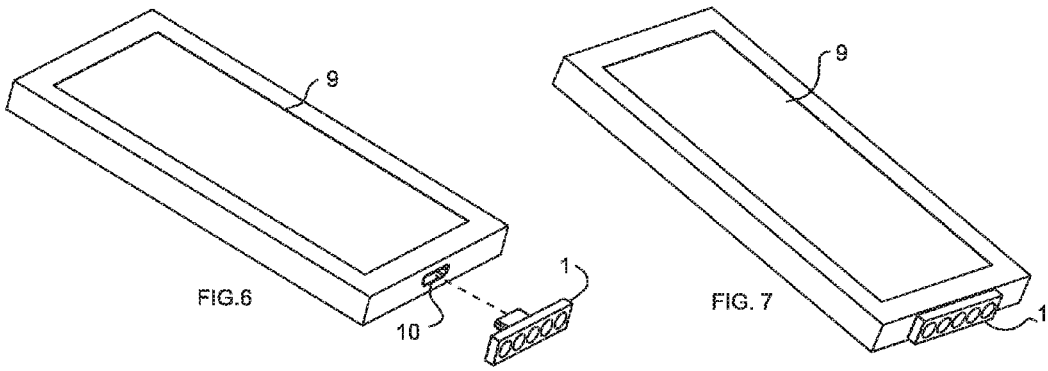
FIG.6
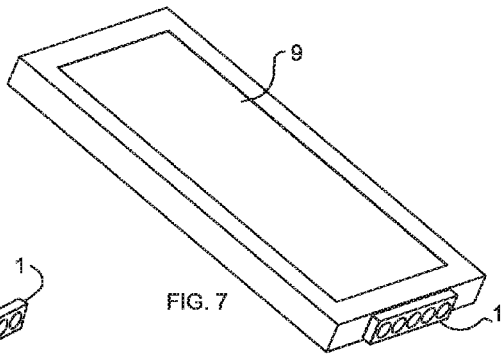
FIG.7

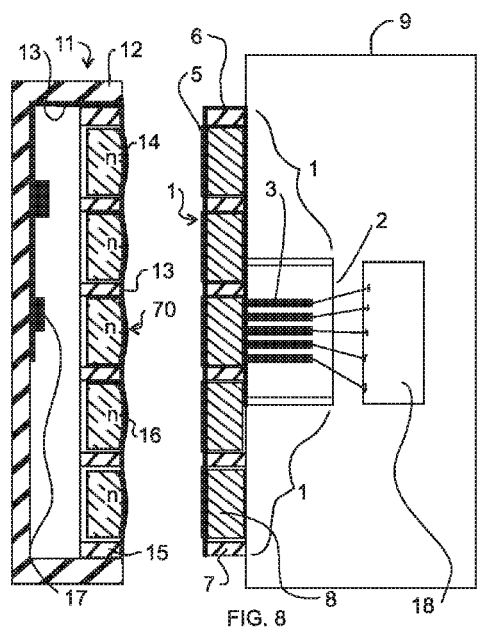
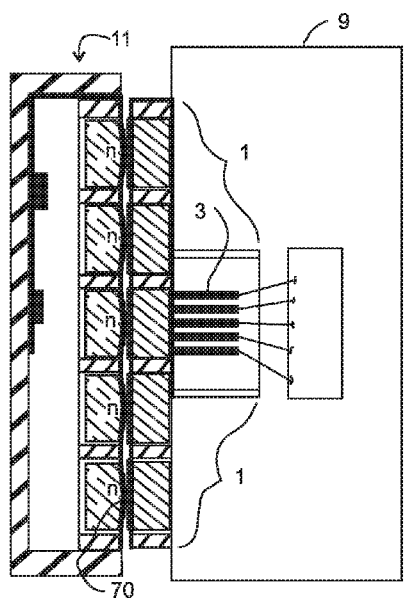
FIG. 8          FIG. 9
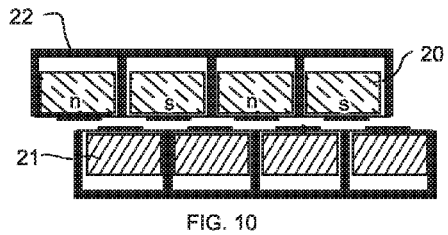
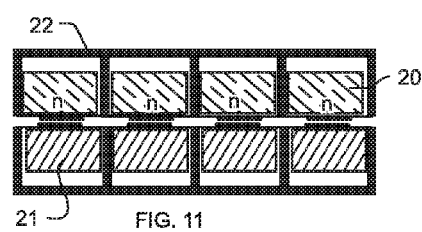
FIG. 10          FIG. 11
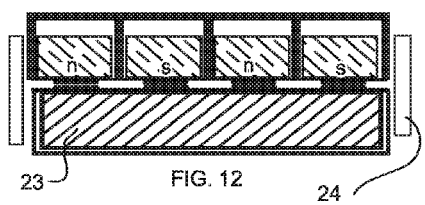
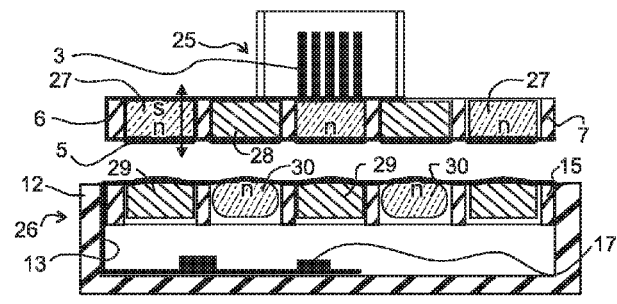
FIG. 12          FIG. 13

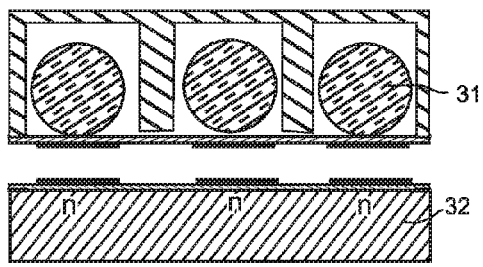
FIG. 14
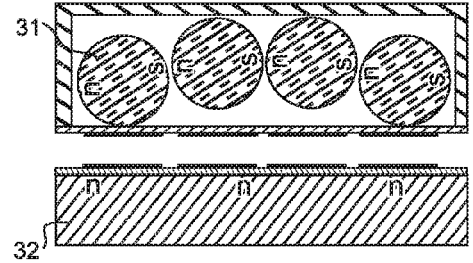
FIG. 15
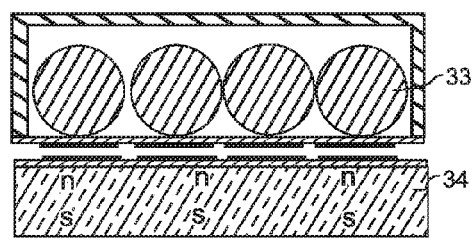
FIG. 16
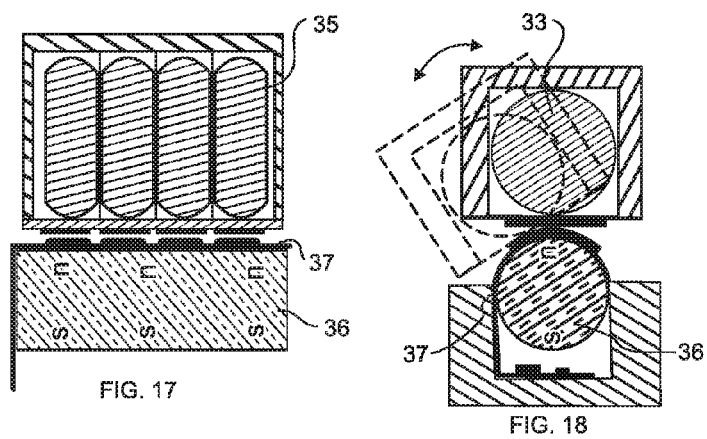
FIG. 17
FIG. 18
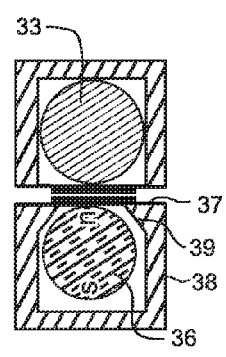
FIG. 19

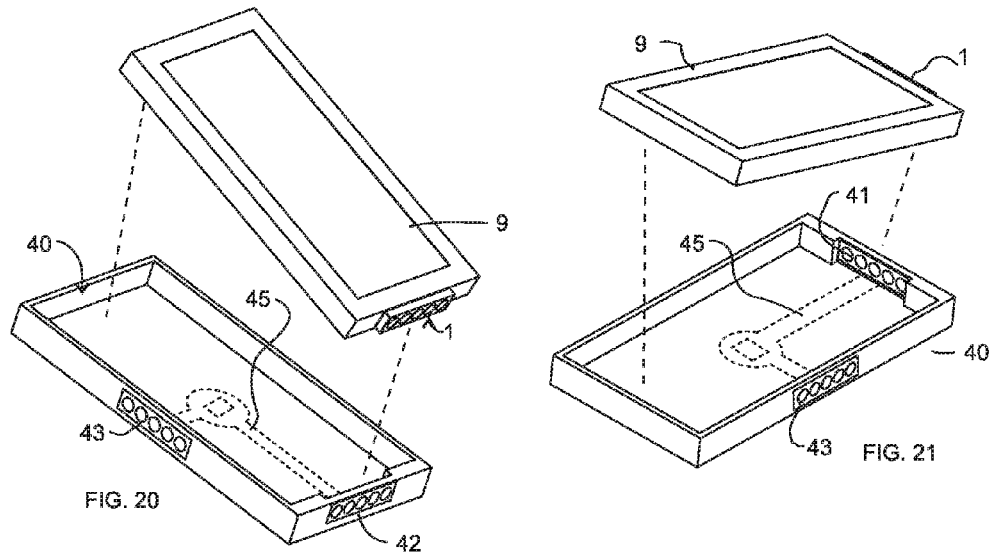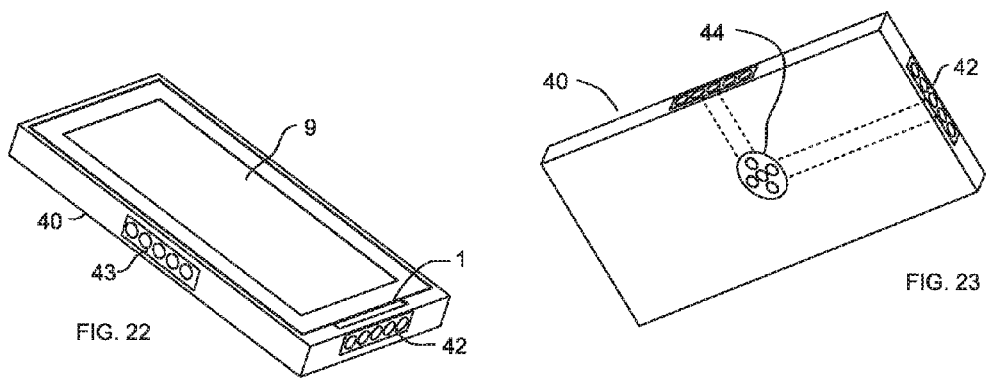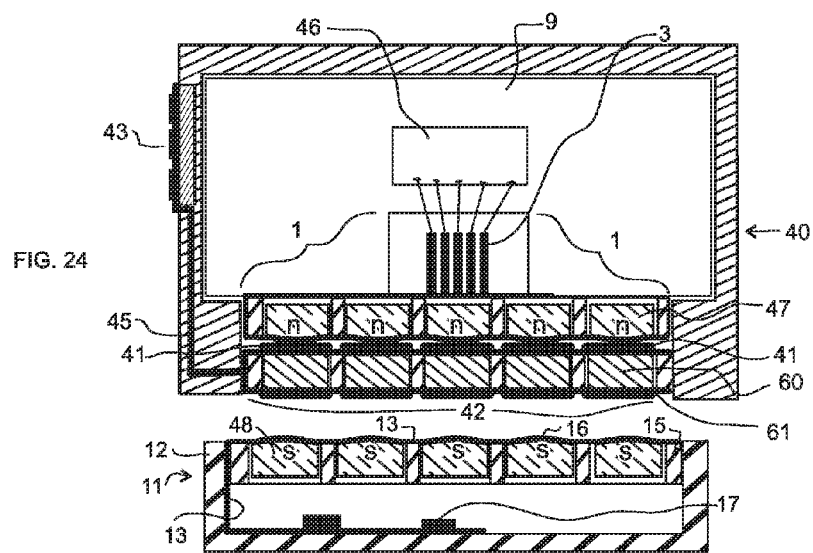

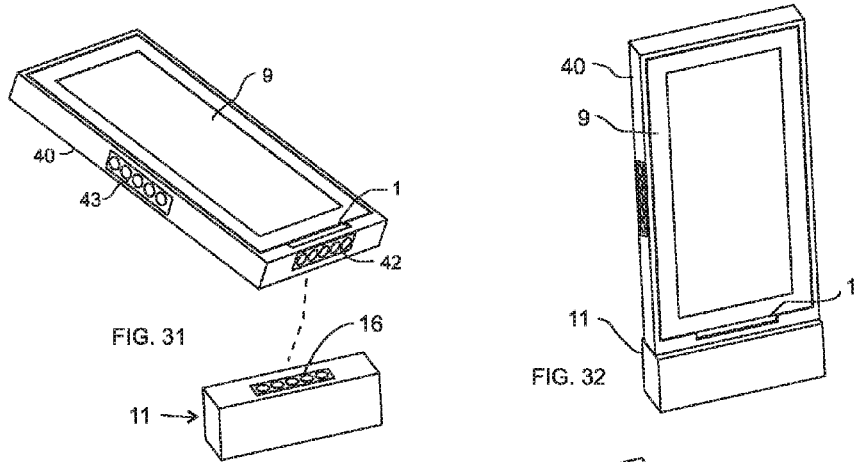
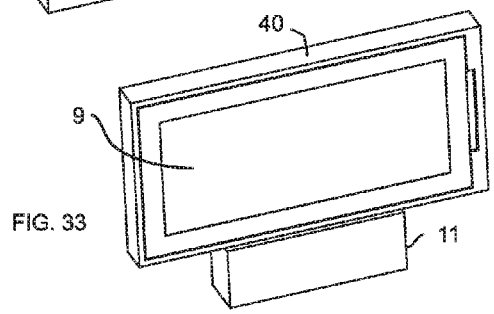
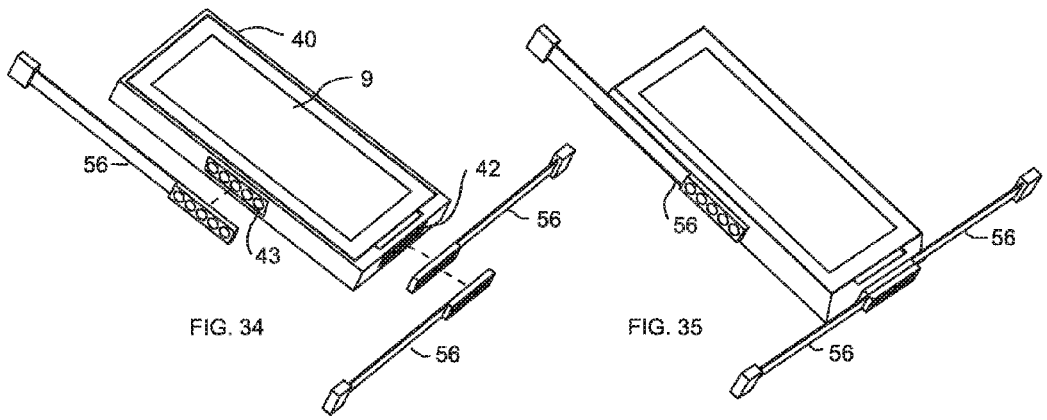
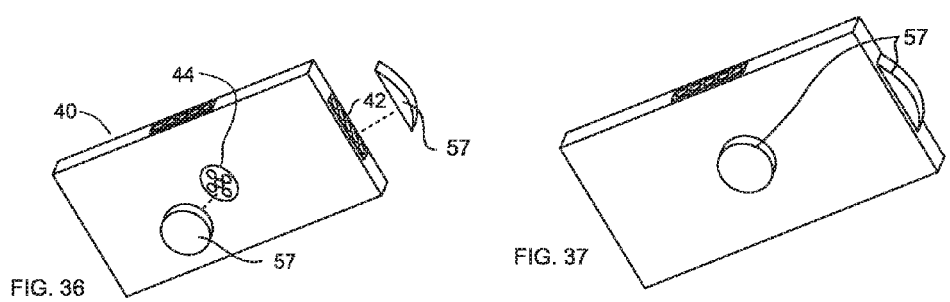

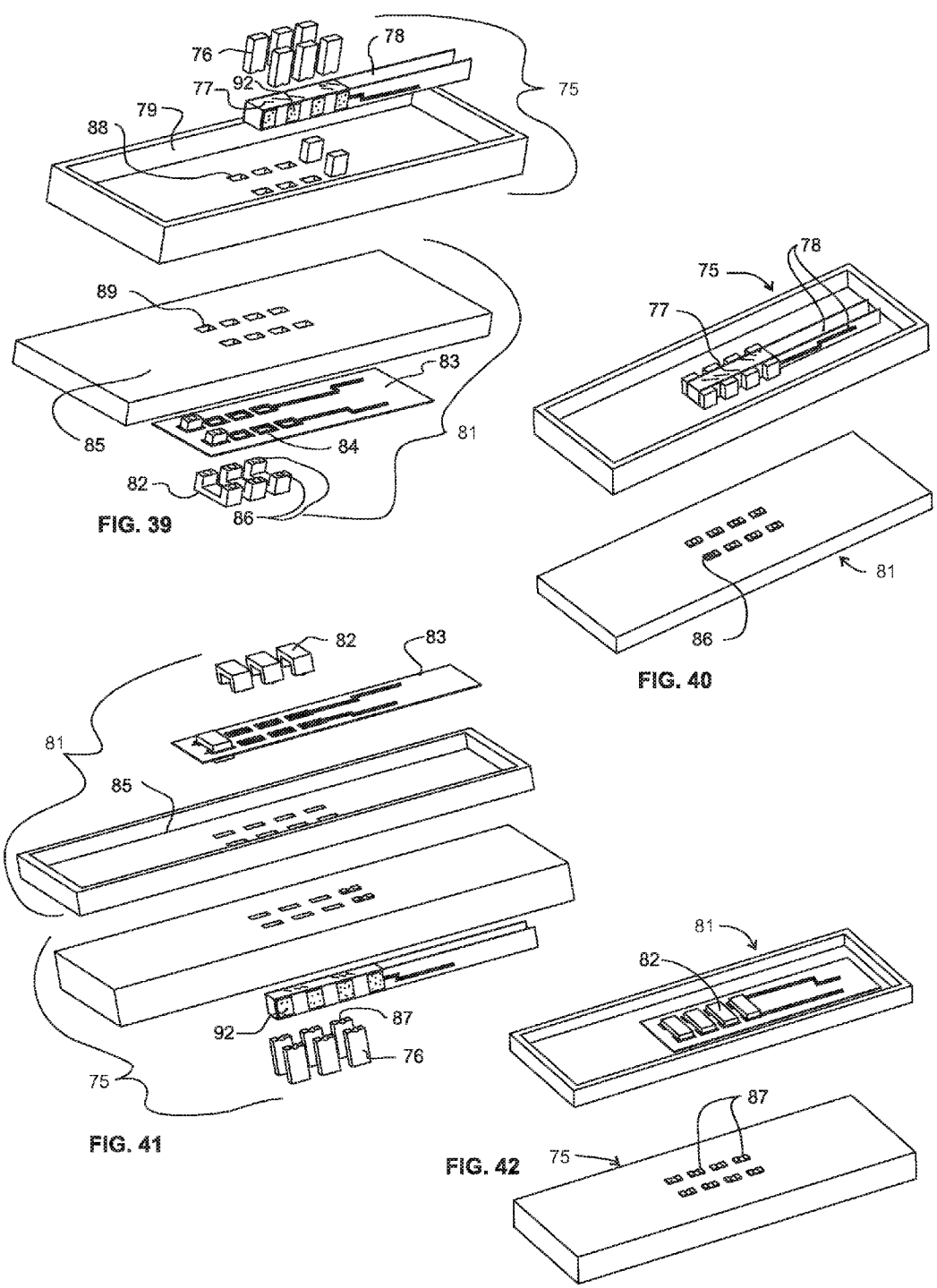

SECTION C-C

SECTION D-D
(DETAIL)

ELECTRICAL CONNECTOR SYSTEM WITH FERROMAGNETIC ACTUATORS

CROSS-REFERENCE TO RELATED APPLICATIONS

This is a continuation application of U.S. non-provisional patent application Ser. No. 13/910,132 filed on Jun. 5, 2013, now U.S. Pat. No. 9,300,081 issued on Mar. 29, 2016, which claims priority of U.S. provisional patent application No. 61/786,037 filed on Mar. 14, 2013 and U.S. provisional patent application No. 61/655,483 filed on Jun. 5, 2012 and is a continuation-in-part of U.S. non-provisional application Ser. No. 13/105,091 filed May 11, 2011 which claims priority to U.S. provisional patent application 61/395,479 filed May 13, 2010, all of which are incorporated herein by reference in their entirety.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent file or records, but otherwise reserves all copyright rights whatsoever.

BACKGROUND OF THE INVENTION

Field of the Invention

This disclosure deals with electrical connections between electronic devices in which electrical continuity is maintained through magnetic attraction.

Description of Related Art

There are many kinds of electrical connectors that are used to provide electrical signal and electrical power from one device to another. Many conventional reversible connectors depend upon overcoming a mechanical force during the mating process in order to provide a residual biasing force between the electrical contacts. Other zero-insertion-force or ZIF connectors, such as those for flat cables (as expected by the name) allow cable contacts to easily slip into position. However, a mechanical force still needs to be applied to create or release contact pressure after the insertion phase. Typically, in order to mate one electrical connector to another device, the two connectors must be oriented within a small range of angles and directed along a mating path within a certain displacement tolerance range. It is fairly easy to connect a USB connector to a mobile phone jack when the male and female members can be observed. This can be difficult in applications in which connectors are hidden in a cavity, such as a protective case for the electronic device. Guiding ramps and floating mechanical assemblies have been employed to ease these difficulties, but this usually increases the size or cost of the assembly.

Some connectors have arrays of fragile pins that can be damaged if not properly aligned, or spring contacts that relax overtime and become less reliable through use.

While some systems attempt to address one or more of these problems, a need still exists for an electrical connector solution that provides a robust electrical and mechanical attachment using magnetic materials. This disclosure is directed at addressing one or more of these difficulties. Other goals of some embodiments are to provide protection of the standard device I/O connector; to provide breakaway capability of attached devices, to facilitate installation of devices into protective cases and to provide a system for providing an adapter to provide device attachment flexibility.

BRIEF SUMMARY OF THE INVENTION

The interposer electrical connector systems and methods described below contain magnetic elements configured to provide any of the following capabilities: self-mating contact forces, protection of device connector structures from dust or moisture, low-profile design, relatively large dimensional tolerances insensitivity than the standard I/O connectors, mechanical flexibility, conformability to curved surfaces, articulated construction designs, and self-aligning electrical contacts. In some embodiments, flexible magnetic interconnects described in co-owned U.S. Pat. No. 8,187,006 are used to provide some of these benefits. Some embodiments include multiple permanent magnets with the same magnetic pole aligned toward the connector interface. Some embodiments include magnetic flux concentrators or pole pieces that direct the magnetic flux circuit to increase electrical contact forces. Some embodiments comprise a single magnet per mated contact pair that provides a plurality of electrical connections.

In a broad sense, an "interposer" means "something that is placed in between (two other things)." For the purposes of this disclosure, the term "interposer electrical connector system" should be interpreted as an electrical connector system that can be configured to be placed between two electronic devices; each device already having existing connectors and also more broadly as an electrical connector system that is placed between two electronic circuits. The embodiments disclosed focus on the magnetic connector embodiments that are located "in between", not on the presence or absence of conventional connectors away from the interposing connection. A connector system that is suitable for interposer use may also have characteristics that match requirements for certain standalone applications, and unless claim terms specifically restrict the application, the broader interpretation should be applied. In this disclosure, the singular term "interposer electrical connector" or "interposer connector" refers to one of the mating halves of an interposer electrical connector system.

Some embodiments include compliant contacts and flexible circuitry. In embodiments of the methods and systems disclosed herein, the compliant contact may be comprised of a metal foil or wire. The term "flexible circuit" (also called "flex circuit" or "FPC"), as used for purposes of this disclosure, includes flexible printed circuitry having electrically conducting lines on electrically non-conducting flexible substrates and electrically conducting flexible members such as metal foils or flexible films which include electrically conducting fillers such as carbon or metals. Embodiments that describe one type of flexible printed circuit should be understood to also illustrate embodiments in which any other type of flexible circuit is substituted for the printed flexible circuit. Embodiments that describe a flexible circuit that is not a flexible printed circuit should be understood to also illustrate embodiments of any other type of flexible circuit including flexible printed circuits. In many embodiments, the distance between magnetic structures is determined in part by the thickness of contact pads on an insulating substrate. The term "contact pad" typically refers to the area of a printed circuit in the vicinity of where something is attached or connected to conduct electrically. In this disclosure, contact pads are formed in some embodiments on flexible printed circuits, while other embodiments include contact pads formed on rigid printed circuits. As used herein for the purposes of this disclosure, contact pads should be interpreted as synonymous with "contact"; thus, contacts and contact pads may be created without using printed circuitry techniques.

When thinness is important, even rigid or brittle substrate materials may become "flexible". In this case, a flexible printed circuit in a description may be constructed from materials that are not flexible in bulk form, or the flexibility may have no functional benefit beyond thinness. For a flexible circuit to be considered "flexible" in a particular application where there is motion or deformation means that it is capable of being moved by the motion of the magnetic structure under a magnetic or other force from another module or external source in that application. In addition to the metal circuitry used with flexible printed circuitry, electrically conducting polymers, inks or other electrically conducting films may be used to fabricate compliant contacts. Compliant contacts of any form may be mechanically supported or integrated into printed circuit boards which include polymeric, epoxy, ceramic or other materials known in electronic packaging. As used herein for the purposes of this disclosure, a "compliant contact" is a contact that has sufficient flexibility to bridge mechanical tolerances in a particular design implementation by changing shape through conforming or deforming to overcome the mechanical separation. A rigid contact structure attached to a contact pad of a flexible substrate is an equivalent form of compliant contact for the purposes of this disclosure. In other words, contact compliancy in embodiments described below include movement of rigid contact structures attached to deformable or flexible substrates such as a flex circuit.

Magnetic structures used in embodiments disclosed herein may be shaped to influence contact geometries and associated Hertz stress of a compliant contact pair. The shape of the magnetic structure may contribute at least temporarily to the Hertzian contact stress profile through deformation of a compliant contact. Other structures including asperities, permanent deformations, and additional conducting material attached to the contact surface may be incorporated into one or more contact surfaces to contribute to the Hertzian contact stress profile as is well-known in the art of electrical interconnects. In embodiments in which the magnetic structures are not required to directly participate in electrical conduction, there is no need to apply any metallic coatings or restrict the choice of magnetic structures to those that are electrically conductive. In embodiments of this disclosure, magnetic elements are positioned to apply forces directly in line with electrical contact pairs when mated. That is, a line may be drawn through a mated contact pair substantially perpendicular to a connector electrical interface that passes through magnetic material located in both connectors.

For the purposes of this disclosure, compliant contacts are not required to be characterized by reversible elasticity. That is, a change in shape resulting from the movement of the magnetic structure may include a permanent component and a temporary component. Embodiments of this disclosure include those insensitive to mechanical creep or modulus changes in the contact. In order to have a connection benefiting from this compliancy at least one contact in a mating pair needs to be a compliant contact and the other contact can be a non-compliant, or rigid, contact. In embodiments having compliant contacts, it is not necessary to have both halves of a contact pair to include compliant contacts.

As used herein for the purposes of this disclosure, the term "module" or "device" should be understood to mean any individual element of the system that may be connected electrically and mechanically to a separate unit using magnetic force.

As is well known in the art, magnetic forces may exist between pairs of magnets and between a magnet and a material attracted to a magnet. Magnets and materials attracted to magnets comprise rare earth and ferromagnetic materials. Rare earth magnets comprise neodymium and samarium-cobalt alloys. Ferromagnetic materials comprise iron, nickel, cobalt, gadolinium and alloys comprised of these materials such as alnico. The properties of the poles of magnets are also well-known, as is the ability to form magnets from cast and sintered material or magnetic particle filled elastomers and polymers. Use of magnetic pole orientations on alternate sides of a connection may be used to "key" allowable connections as is well-known with magnetic connectors. As a result, as used herein for the purposes of this disclosure, the term "magnetic structure" or "magnetic material" should be understood to include either a magnet or a material attracted to a magnet. A magnetic structure as used herein for the purposes of this disclosure may also include the combination of at least one magnet and at least one "pole piece" made of ferromagnetic material. The ferromagnetic material in such a combination may be used to influence the distribution of the magnetic flux lines of the magnet. The ferromagnetic material in such a combination may also be used to shape contact geometries. Although not specifically shown in the figures, it is understood that in addition to "permanent magnets," "temporary magnets" may be created by magnetic induction to create magnetic forces that could be used with the electrical connectors illustrated. Unless there is specific mention to orientation of magnetic poles, it should be understood that at least one or the other of the two magnetic structures creating an electrical contact pair from a magnetic attraction is a magnet. For convenience in describing the inventive concepts herein, the "north" pole of a permanent magnet is designated as the "first pole" and the "south pole" is designated as the "second pole". For a permanent magnet, the external magnetic flux lines would then be generally considered to emanate from the first pole and re-enter the magnet at the second pole. This pole designation is arbitrary and the opposite designation should also be considered to be disclosed. For the purposes of this disclosure, a permanent magnet is oriented substantially perpendicular to a surface when a line connecting the magnet north and south poles is substantially perpendicular to the surface. In this orientation, one pole will be closer to the surface than the other pole. As a result, only the pole closest to the surface needs to be identified to understand the orientation of both magnetic poles with a simple two-pole magnet. Magnets with more than one pole on a surface are known in the art and may be used with the inventive concepts discussed herein. For purposes of this disclosure, such structures will be considered to be equivalent to an assembly of simple permanent magnets each having only two poles.

Due to the general interchangeability of which element in the pair is a magnet, it should be understood for the purposes of this disclosure that a description of a contact pair in which one magnetic structure is described as a magnet and the other as a magnetic material, in the absence of statements to the contrary, also discloses an equivalent structure in which the materials of the magnetic structures of both halves are switched. In addition, a magnetic material in embodiments discussed herein may be replaced with a magnet if one of the magnets in a contact pair is free to reorient magnetic poles to create an attractive force, or is by other means mechanically oriented such that there is magnetic attraction between the adjacent magnetic poles on opposite sides of the electrical contact interface.

As used herein for the purposes of this disclosure, the terms "to affix" and "to attach" one element to another element should be interpreted as resulting in some restriction in the relative motion of the elements. The restriction in motion may be temporary and/or reversible in nature and may result from causes comprising magnetic attraction, adhesive or thermal bonding, or mechanical engagement. An element may be affixed to another element and still have some range of free movement in one or more dimensions. For example, an element may move in three dimensions while affixed within a cavity sized to prevent movement of the element outside of the cavity. Direct physical contact between elements is not required for one to be affixed to the other. Similarly, elements may be "proximate" to each other without being in direct physical contact. For elements to be "proximate" one another means that the elements are located relatively close to one another; that is, that the separation distance is typically no more than a few times the longest dimension of the elements.

To be "disposed along an interface" should be interpreted to be placed through, on, over, under or beside the interface. A group of elements so disposed will generally be substantially along the contour of and proximate to the interface.

Other terms in the specification and claims of this application should be interpreted using generally accepted, common meanings qualified by any contextual language where they are used.

In embodiments of the methods and systems disclosed herein, there is generally no requirement for rigid printed circuit boards, rigid or resilient electrical contact structures, stiff electrical contact support structures or housings. In addition, the design of flexible printed circuit boards and other compliant contact structures may be readily customized somewhat independently from the design of the larger mechanical structure of the modules. This ability to accommodate changes allows for flexibility in design and tooling flexibility. Since electrical contact mating pairs can be designed to function substantially independently, efficiencies in designing, fabricating and testing different composite assemblies from a small number of component designs may be gained. Cost efficiencies may be gained in the nesting or "panelization" of the flexible printed circuits, fabrication of mechanical structures for modules and standardization of a limited number of parts.

Accordingly, in one embodiment there is an electrical connector system comprising:
  a first connector comprising:
    i a plurality of permanent magnets each characterized by a first and second magnetic pole;
      wherein the magnetic poles are aligned in the same direction substantially perpendicular to the first connector electrical interface; and
    ii a first plurality of contact pads disposed proximate the first magnetic poles along the first connector electrical interface;
  wherein the first plurality of contact pads is designed to provide electrical continuity with a second plurality of contact pads along the electrical interface of a second connector through magnetic attraction of the plurality of permanent magnets to magnetic material disposed proximate the second plurality of contact pads in the second connector when the first connector electrical interface is brought in close proximity to the second connector electrical interface.

Another embodiment is an electrical connector system comprising:
  a) a first connector comprising:
    i a plurality of permanent magnets each characterized by a first and second magnetic pole;
      wherein the magnetic poles are aligned in the same direction substantially perpendicular to the first connector electrical interface;
    ii a first plurality of contact pads disposed proximate the first magnetic poles along the first connector electrical interface; and
  b) a second connector comprising:
    i a plurality of magnetic elements; and
    ii a second plurality of contact pads disposed proximate the plurality of magnetic elements along the second connector electrical interface;
  wherein the connectors are configured to be capable of providing electrical continuity between the first plurality of contact pads and second plurality of contact pads when the first connector assembly electrical interface is brought in close proximity to the second connector electrical interface.

Another embodiment is an electrical connector system comprising:
  a) a first connector comprising:
    i a permanent magnet characterized by first and second magnetic poles; and
    ii a first plurality of electrical contacts disposed along the first connector electrical interface proximate the magnet;
  b) a second connector comprising:
    i a first plurality of magnetic elements disposed proximate a second plurality of electrical contacts, the first plurality of magnetic elements and second plurality of electrical contacts disposed along the second connector electrical interface;
  wherein the connectors are configured to be capable of providing electrical continuity between the first plurality of contacts and the second plurality of contacts when the first connector assembly electrical interface is brought in close proximity to the second connector electrical interface.

Another embodiment is an electrical connector system comprising:
  a) a first connector comprising:
    i one or more first magnetic elements; and
    ii one or more first contact pads disposed proximate the one or more first magnetic elements along the first connector electrical interface; and
  b) a second connector comprising:
    i a plurality of second magnetic elements;
    ii a flexible circuit comprising:
      a plurality of second contact pads disposed proximate the plurality of second magnetic elements;
      a plurality of rigid contact structures disposed along the second connector electrical interface proximate the plurality of second magnetic elements;
      wherein the rigid contact structures are in electrical continuity with the second contact pads; and
      wherein the rigid contact structures are configured to be capable of providing electrical continuity with the first contact pads as the first connector is brought in close proximity to the second connector.

Further embodiments include combinations of some of the individual elements described above as well as additional elements and refinements of the above.

BRIEF DESCRIPTION OF THE DRAWINGS

FIG. 1 is an embodiment of an interposer connector that interfaces with a conventional I/O connector of an electronic device.

FIG. 2 is a rear isometric view of the interposer of FIG. 1.

FIG. 3 is an exploded front isometric view of the interposer of FIG. 1 and FIG. 2.

FIG. 4 is an exploded rear isometric view of the interposer of FIG. 1 and FIG. 2.

FIG. 5 is cross-sectional view of the interposer of FIG. 1 and FIG. 2.

FIG. 6 is an isometric exploded view of an interposer connector prior to installation into an electronic device.

FIG. 7 is an isometric view of an interposer connector after installation into an electronic device.

FIG. 8 is a schematic cross-sectional unmated view of an embodiment of an interposer that incorporates ferromagnetic actuators installed into a first electronic device, and a second electronic device connector with flexible magnetic interconnects incorporating permanent magnets, flexible circuitry and electrical contacts FIG. 9 is a mated view of the interposer and second electronic device of FIG. 8.

FIG. 10 is a cross-sectional view of an embodiment of interposer connector and electronic device connector illustrating the property where mated contacts do not have self-aligning properties resulting from the arrangement of magnetic and ferromagnetic components.

FIG. 11 is a cross-sectional view of an embodiment of interposer connector and electronic device connector illustrating the property where mated contacts have self-aligning properties resulting from the arrangement of magnetic and ferromagnetic components FIG. 12 is a cross-sectional view of an embodiment of interposer connector and electronic device connector containing a continuous fixed ferromagnetic component in one side of the connector, and movable permanent magnetic actuators in the second mated connector.

FIG. 13 is an unmated cross-sectional view of an embodiment of interposer connector and electronic device connector illustrating another arrangement of self-aligning ferromagnetic and permanent magnet actuators in the interposer and electronic device.

FIG. 14 is a cross-sectional view of an embodiment of interposer connector and electronic device connector including loosely-constrained isolated spherical permanent magnet actuators in one of the connectors, and an extended magnetic material in the mating connector.

FIG. 15 is a cross-sectional view of an embodiment of interposer connector and electronic device connector including loosely-constrained, non-isolated spherical permanent magnet actuators in one of the connectors, and an extended magnetic material in the mating connector. The figure illustrates undesired magnetic attraction between adjacent permanent magnet actuators when the spherical actuators are spaced too closely to one another.

FIG. 16 is a cross-sectional view of an embodiment of interposer connector and electronic device connector including spherical ferromagnetic actuators in one of the connectors, and an extended permanent magnetic material in the mating connector.

FIG. 17 is a cross-sectional view of an embodiment of interposer connector and electronic device connector including discrete oblate closely spaced ferromagnetic actuators in one of the connectors, and an extended permanent magnet component in the mating connector.

FIG. 18 is a cross-sectional view of an embodiment of interposer connector and electronic device connector including spherical and/or cylindrical magnetic components and contact surfaces on one connector half, facilitating relative angular rotation of the connector.

FIG. 19 is a cross-sectional view of an embodiment of interposer connector and electronic device connector including spherical and/or cylindrical permanent magnetic components in one connector half, and spherical and/or cylindrical ferromagnetic actuator components in the mating connector half.

FIG. 20 is a top exploded isometric view of a first electronic device with interposer connector installed, with the first electronic device being assembled into a case structure incorporating mating interior interposer connectors and exterior interface connectors.

FIG. 21 is a rotated isometric view of FIG. 20 where the interior case contacts that mate with the interposer are visible in the case structure.

FIG. 22 is an assembled top isometric view of the interposer, electronic device and case of FIG. 20.

FIG. 23 is an assembled bottom isometric view of FIG. 22

FIG. 24 is a schematic cross-sectional view of an embodiment of magnetic interposer connector installed into a first electronic device, and the first device with interposer installed into a case with interior interface connector pads. A second exterior electronic device is shown unmated to the case contacts.

FIG. 31 is an unassembled isometric view of a first electronic device with interposer installed, electrically connected to interior contacts of the case, the case having exterior contacts connected to the first device through the interposer. Exterior case contacts are shown unassembled to the mating contacts of a second electronic device such as a dock.

FIG. 32 is an isometric view of FIG. 31 where the first electronic device with case are assembled and electrically connected to second electronic device such as a dock.

FIG. 33 is an isometric view of the components of FIG. 32 where the case with first electronic device have been rotated 90 degrees into "landscape" viewing orientation.

FIG. 34 is a partially unassembled exploded isometric view of the first electronic device with interposer installed into a case, with a variety of mating magnetic accessories such as stacking cables that are magnetically attached to the case contacts.

FIG. 35 is an assembled isometric view of FIG. 34.

FIG. 36 is a partially unassembled exploded isometric view of the first electronic device with interposer installed into a case, with a variety of mating magnetic electronic accessory modules that are magnetically attached to the case contacts.

FIG. 37 is an assembled isometric view of FIG. 36.

FIG. 39 is an exploded top isometric view of an embodiment of top and bottom connector structure incorporating multiple ferromagnetic pole piece actuators in one connector half and movable ferromagnetic armature actuators in the mating connector.

FIG. 40 is an assembled top isometric view of the top and bottom connectors of FIG. 39.

FIG. 41 is a bottom view of FIG. 39.

FIG. 42 is a bottom assembled isometric view of FIG. 41.

DETAILED DESCRIPTION OF THE INVENTION

Figure 25:
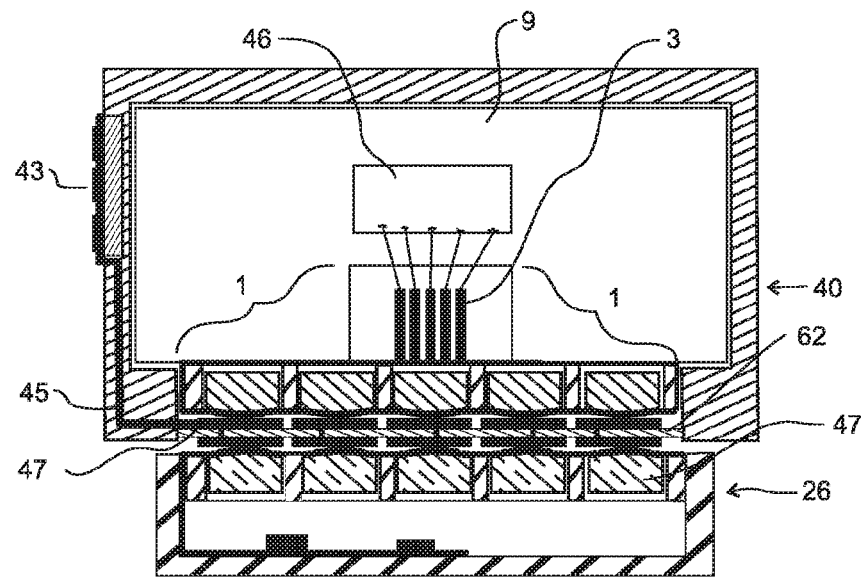
FIG. 25 is a view of a system similar to FIG. 24 with the second electronic device connector mated to the case connector.

This detailed description defines the meaning of terms used herein and specifically describes embodiments in order for those skilled in the art to practice the invention. The description and drawings of specific embodiments are provided as examples of the principles and not to limit the invention to the specific embodiments illustrated and described. Characteristics of an embodiment described herein may be combined with characteristics of other embodiments in a suitable manner without limitation.

FIG. 1 through FIG. 9 show an embodiment of interposer connector 1, designed to interface with a conventional main I/O connector 10 of an electronic device 9, which may be, for example, a smart phone, tablet device, portable computer, or other electronic assembly, whether portable or not. Typically, device 9 will have at least one main I/O connector 10, such as a standard USB, micro-USB, or custom I/O connector (APPLE$^{Inc.}$ and others), utilized for battery charging and operating power, and various syncing and communications functions with other devices. These standard I/O connectors are often not ideal in design, function and durability for docking and repeated attachment of peripheral devices.

Additionally, these standard I/O connectors are subject to damage during use and environmental contamination, cannot be easily cleaned, and are not easily environmentally sealed from the internal components of the device. In general, these types of standard I/O connectors are particularly unsuitable for incorporating into a protective case structure where the I/O connector 10 must be mated with a connector located inside a cavity. Standard USB, mini-USB, micro-USB, as well as most male and female connector pairs have constraints upon the direction of approach to properly establish the connection. While a cable to device jack mating process is readily accomplished by sight and feel, trying to connect male and female connector halves inside other structures or to connect multiple pairs of male female connectors simultaneously can be difficult due to mechanical tolerances of individual contact elements and between ganged connectors. Various forms of the interposers described in this disclosure provide alternative connector pairs that do not share these constraints.

In the embodiment shown in FIG. 1 through FIG. 9, interposer connector 1 comprises a mating connector feature 2 that is compatible with the installed I/O connector 10 of device 9, and incorporates appropriate mechanical features and connector pins 3 to mate with I/O connector 10. For example, feature 2 may be a male USB connector element and 10 can be a female USB connector jack. Interposer connector 1 contains a flexible circuit 4 with interposer connector pads 5, interposer circuitry 6, retainer 7 and magnetic components 8. Circuitry 6 is connected to the appropriate pins 3 and pads 5 as required to electrically connect to the complementary pin outs of I/O connector 10 of device 9. The number and order of pins on the interposer need not necessarily correspond to the pins of the device I/O connector. Although the contact pads 5 in these figures are located on a single-surface flex circuit with wiring wrapping around two other surfaces, contact pads may be of different shapes and extend across multiple surfaces. Similarly, contact pads 5 may be connected to pins 3 through circuitry 6 that follows a different path through the body of the interposer.

Magnetic components 8 may contain, or are constructed of, either ferromagnetic components (e.g. steel, iron, nickel) or permanent magnet components (e.g. rare earth permanent magnetic materials such as Nd—Fe—B, or ferrite magnetic materials). A magnetic component 8 may be entirely comprised of magnetic material, or may contain a magnetic component, such as a piece of magnetic material overmolded, covered or inserted into a non-magnetic polymer or metal (e.g. aluminum). As will be described below, many combinations and shapes of ferromagnetic and permanent magnet components may be utilized.

In the example embodiment described above, magnetic components 8 are permanent magnets, axially magnetized with their poles preferably aligned in like directions (for example, all the "north" poles facing towards the interposer connector interface pads as shown in FIGS. 8 and 9). Magnets 8 are retained in a retainer 7 preferably made from a non-magnetic material such as polymer or aluminum. The magnets may be rigidly fixed within retainer 7, however, improved function is enabled by allowing the magnets to freely move within retainer cavities 99, which makes construction of the connector simpler, allows the magnets to self-orient somewhat depending upon relative size with respect to the cavities in operation, and allows compliancy of the contacts in operation. If the magnetic components 8 are fixed within the interposer, it is preferable to have the mating connector contain compliant/flexible contacts; i.e., at least one connector side of a mated contact pair, contains a flexible interconnect structure as described in the above referenced applications. The retainer and contacts can have a high degree of compliancy if constructed of a compliant, flexible material such as an elastomer or foam material. Both "stretching" and deformation of the retainer and overlying flexible circuit 4 and/or contacts 5 may thus facilitate compliancy of the contacts, which is enhanced by the magnetic attraction of magnets 8 with mating connector magnetic components. Utilizing a flexible retainer and flex-circuit construction can also incorporate a degree of mechanical compression of the mating connectors in the presence of gravity or mechanical forces. Note that elasticity of the contact surfaces or flexible circuit substrate is not necessary for reliable contact forces with flexible magnetic interconnects due to their self-attractive nature.

Interposer 1 may be mechanically retained to device 9 with mechanical fastening methods and/or adhesives, and/or by retention features within the device and interposer connector. The example interposer 1 may also contain additional mechanical features such as a frame structure around the perimeter of the contacts that may provide additional alignment, mechanical retention or environmental sealing.

In an example usage of interposer 1, FIG. 8 and FIG. 9 show a schematic sectional view of an embodiment of interposer connector 1 and device 9 with conventional connector attachment complimentary to feature 2, and an example peripheral device 11, such as a docking or power station, syncing apparatus, memory storage, or any variety of active devices that communicate with the electronic circuits and components 18 of device 9. FIG. 8 shows peripheral device 11 in the unmated position, and FIG. 9 in the mated position. In this example, the magnetic components of the interposer comprise permanent magnets 8 with their poles aligned (e.g. cylindrical shaped magnets, axially magnetized with all "n" poles facing outward toward contacts), and positioned behind flexible circuit contacts 5. In this embodiment, the magnetic structures are located proximate and disposed with the contacts along the electrical interface, but are not in direct physical contact or electrical continuity with the contacts, since the flexible substrate separates these elements. Peripheral device 11 contains a complementary connector 32 contact structure; in this example the peripheral device connector contains ferromagnetic actuators 14, positioned behind flexible circuit 13 with contact pads 16. Contact pads 16 are connected via circuitry to additional electrical components 17 in device 11. Preferably, at least one side of a mated interposer contact pair contains curved, domed or spherical contact surfaces to provide a uniform, defined contact point and higher Hertzian contact stress than would be obtained with flat mating surfaces. One or both sides of the contact pairs may be compliant under the magnetic attraction of the magnetic elements, and the contacts 5 and 16 are compressed under the magnetic force, providing electrical and mechanical connection.

With the first poles of magnets 8 all aligned in the same direction proximate to and substantially perpendicular to the electrical interface as shown in FIG. 8 and FIG. 9, in combination with the discrete ferromagnetic actuators (versus a solid ferromagnetic plate) a self-aligning, attractive force between the mating contact pairs is established along the electrical interface of the connectors. Referring to FIG. 10, with an alternating pole (n-s-n-s) arrangement of closely spaced magnets 20, the mating ferromagnetic actuators 21 tend to be forced into a position intermediate between the ferromagnetic actuators, thus not providing direct self-aligning properties between the contacts in a linear array. Magnets 20 with aligned poles tend to automatically align with adjacent discrete ferromagnetic actuators 21 as illustrated in FIG. 11. As shown, a line may be drawn through a mated contact pair substantially perpendicular to the connector electrical interface that passes through magnetic material located in both connectors. Additionally, when utilizing permanent magnets having alternating poles that are spaced closely together within a connector structure, movement of the magnets can be restricted by interaction and magnetic attraction of adjacent magnets in a connector half, inhibiting desired contact pair attraction function in designs where the magnets are intended to move within the housing 22. As illustrated in FIG. 12, an alternating pole magnet arrangement, when used in combination with a one-piece ferromagnetic backing 23 on the mating connector, provides more magnetic force because of higher magnetic flux concentration (that is, a more efficient magnetic flux circuit) from each magnet, through the ferromagnetic backing, and to the adjacent oppositely polarized magnet. In this case, auxiliary mechanical locating features 24 may be used to properly locate the mating connectors. Similar mechanical locating features 24 may be used with the configuration of FIG. 10 with the same magnetic pole orientations with discrete ferromagnetic pieces. In general, alignment of a ferromagnetic plate with a series of magnets is not as self-aligning regardless of their polarity or orientation. In some cases, frictional forces may prevent loosely-constrained magnets from reorienting under changing configurations. For these reasons, the configuration of FIG. 11 is preferred when self-alignment is important in an application.

There are many possible combinations, shapes, sizes, and magnetic polarity arrangements of ferromagnetic and permanent magnet actuators that may be used in the interposer connector 1 and a counterpart connector configured to mate with it. For example, FIG. 13 shows another representative configuration of self-aligning actuators in an interposer 25 and peripheral device 26 configured to mate with it. In this example, interposer 25 contains both permanent magnet actuators 27 and ferromagnetic actuators 28 alternately arranged in this cross-sectional view of a linear array of contact pairs. The mating connector structure of peripheral device 26 contains alternating peripheral connector ferromagnetic actuators 29 and peripheral connector permanent magnet actuators 30. Note that for self-alignment, the poles of the magnets on each side of the connection interface have poles that are aligned with each other. In addition, all of the magnets have the same magnetic pole (for example, "north") facing the interface and toward the discrete ferromagnetic structure disposed directly opposite the interface. The combination of the attraction to the ferromagnetic elements across the interface from the permanent magnets and the repulsive forces from like poles combine to help center the two connector halves with respect to each other during the mating process.

The shapes of the actuators of the mating contact pairs may be of a variety of shapes to ensure reliable contact upon magnetic compression of the flexible contact pads. The example shown in FIG. 13 contains domed actuators on the peripheral device 26 connector and flat actuators on the interposer 25 side.

Other examples of actuator types are shown in FIG. 14 through FIG. 20. FIG. 14 shows spherical permanent magnet self-aligning actuators 31 in combination with a magnetic material 32. Preferably, some distance is present between adjacent spherical actuators 31 to minimize interaction.

Note that the interposer connector, the shape of the actuators in the mating connectors, magnet polarity, contact design, etc. described may generally be interchanged between the interposer and the mating connector in providing the same functional benefit. However, this is not always the case as will be described below in comparing FIG. 15 and FIG. 16.

FIG. 15 is similar to FIG. 14 except that the spherical permanent magnets are more strongly interacting with each other because they are not separated from one another. The magnets as illustrated in FIG. 15 will interact with each other in an uncontrolled fashion in the absence of an external magnetic aligning force. As magnetic material 32 in the complementary connector approaches, the spherical magnets may not preferentially align with their magnetic poles directed toward the interface. As a result, the magnetic flux paths and resulting contact forces may not be optimal in the mating connectors.

In contrast, FIG. 16 shows a combination of spherical ferromagnetic actuators 33 in combination with a permanent magnet mating actuator 34. In this case, the spherical actuators do not interact with each other in the absence of a magnetic field. The magnetic flux paths are essentially under the control of the extended permanent magnet 34. Ferromagnetic actuators and mating permanent magnet actuators on the opposing connector may be closely spaced, and a variety of shapes may be used, such as the spheres 33 of FIG. 16 or the flattened oblate shapes 35 of FIG. 17. Permanent magnets used with ferromagnetic actuators may be varied shapes, including flat magnets, and cylindrical magnets 36 of FIG. 18. Circuitry with contacts 37 may be rigidly affixed to one side of a mating contact pair, as shown in the cylindrical magnet of FIG. 18, or suspended over a housing/retainer feature 38 containing retention features 39 for the actuator as shown in FIG. 19. Articulation of the connectors while maintaining electrical contact is possible with certain shapes of magnets and actuators, such as the rotatable cylindrical example shown in FIG. 18.

The permanent magnet actuator may be segmented or composed of a number of closely spaced magnets (emulating a continuous magnet) to provide mechanical flexibility and to provide other physical shapes of magnetic actuators. Ferromagnetic pole pieces or actuator elements may also be used to provide geometric flexibility or concentrate magnetic flux lines.

A particular use for the interposer connector systems described herein is for electrical connectors between electronic devices and protective cases. These are often "blind" connections where feedback on relative orientation of connector halves is absent. Beyond the self-alignment and no insertion force features, some of these applications also benefit from electrical connection performance under shock and vibration, reduced manufacturing mechanical tolerances, reliability, durability, and product salability due to form and function. Referring to FIG. 20 through 24, an example application of embodiments described herein is the use of an interposer connector 1, device 9 with a "smart" enclosure, or case structure 40. The case structure 40 may be made from materials such as injection-molded polymers, elastomers or metals, and contains an integrated case interior interposer mating connector 41 that mates with interposer 1. The case may contain other interior and exterior connectors to facilitate attachment and electrical interconnection of various accessories and peripheral devices to the case. For example, FIG. 20-FIG. 23 illustrate a case 40 containing the case interior interposer mating connector 41, a bottom 42, side 43 and rear 44 exterior accessory connector respectively. These accessory connectors are connected to the device 9, through circuitry to the interior interposer mating connector 41, and from the interposer 1 to device 9 through the device system connector 10. The case interface connectors may be connected through flexible printed circuits 45, PCB's and/or wiring embedded within the case structure; the flexible printed circuit/PCB's may also contain active and passive electrical devices to provide required and extended electrical and software interface to device 9 and to attached peripheral devices 11 attached to the case exterior connectors.

The use of the interposer connector of the inventive concepts disclosed herein allows several potential advantages, including protection of the device system connector from wear and tear, elimination of mating conventional "pin and socket" male/female connectors with previously described insertion requirements and damage potential from mechanical or environmental contamination. The sealed, substantially planar contacts and mechanical compliancy overcome these limitations, allowing a durable mechanical sealed interconnect, that is "self-mating", has no comparable restrictions in the mating path directions, no pins/sockets susceptible to damage and contamination, and accommodates wide dimensional tolerance variations of the system parts. The interposer described may be installed "blind" into a case at almost any angle for which the device does not interfere with the case. The interconnection is also held together with magnetic force, so additional mechanical retention and contact force is not generally required, which allows a large degree of design flexibility. Since the contacts and circuitry are typically flexible printed circuitry based, the electrical and mechanical properties are readily tailored versus conventional metal stamped connector structures. Another advantage of the interposer used in combination with the case 40 construction described is that the case may be completely sealed (interior and exterior), with the connectors substantially planar and sealed to the case structure (both internal and external to the case). This allows the case assembly to be easily cleaned without contamination and damage to the connectors of the device and any electronics embedded within the case.

FIG. 24 is a schematic cross-sectional view of a case 40 including an interposer connector 1, interior interposer mating connector 41, exterior bottom accessory case connector 42 and side wall accessory case connector 43. Interposer 1 may be installed through features 2 into the system connector (such as micro-USB) of device 9, the interposer connector also makes electrical contact with the adjacent mating connectors of the interior interposer mating connector 41; an electrical connection is made through the exterior wall of the case 40 to the electrical contacts of exterior connector 42, which in turn may be connected to external device 11 having its own complementary connector. Additional electrical connections may then be accomplished through other circuitry in the protective case such as illustrated circuitry 45 or other connections to connectors 43 and 44 and or other interfaces to peripheral devices. The example of FIG. 24 shows a construction where interposer 1 contains permanent magnet actuators 47 with the "north" poles aligned and directed toward and proximate to the interior electrical interface, and flexible/conformable contacts as described previously. The mating case connector 42 contains discrete ferromagnetic actuators 60 and contacts 41 on one side of the actuators and contacts 61 on the opposite side. With this example construction, accessory 11 interface connector may contain permanent magnets 48 with "south" poles aligned and directed toward the exterior interface (i.e. the opposite polarity of the exterior case mating connector's permanent magnets). In this example, the peripheral device can be attached directly to the interposer connector 1 if the case 40 is removed.

As described previously, the interposer connectors, and/or the case connectors may be constructed such that the connector housing is flexible/compressible; the flexible magnetic contacts are also compliant and "self-assembling", providing the ability for "blind" connections at multiple angles. As an example, the case 40 or the interposer retainer 7 may be constructed of silicone rubber. Many interposer and connector arrangements of magnetic actuators, and contact designs are possible as described previously.

FIG. 25 shows another example of a case feed through connector 62 that contains no magnetic components. The case connector 62 is compressed by magnetic force between the magnetic elements of the interposer 1 and the peripheral device connector 26. The case connector in this example may be comprised of a thin double-sided flexible printed circuit, PCB, molded interconnect, or insert-molded contacts and secured to the case housing.

Figure 26:
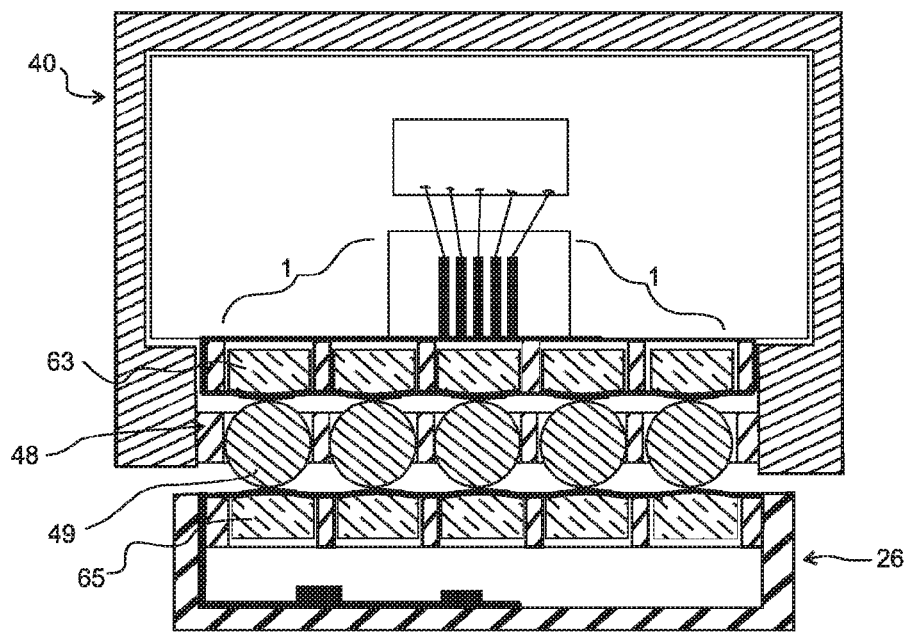
FIG. 26 shows a cross-sectional schematic view of another embodiment of interposer, first electronic device, case and a second electronic device magnetically attached to the exterior case contacts.

FIG. 26 shows another example of case connector that connects magnetically to interposer 1 utilizing direct electrical conduction magnetic components 49. As illustrated, the magnets 63 and 65 in the internal and external connectors are oriented in the same configuration as magnets 47 and 48 in FIG. 24. This direct conduction case connector does not utilize an overlying flexible/conformable contact, but conducts electricity directly through contact with the magnetic components 49 that extend through the wall of the case from the inside to the outside. The magnetic components 49 may be ferromagnetic material (iron) plated with copper, nickel, gold, tin, for good conductivity and passivation, or permanent magnet materials similarly plated. The magnetic components 49 may be of many shapes, and rigidly, loosely and/or flexibly mounted to the case housing. As in previous descriptions, various combinations of permanent magnet and ferromagnetic components may be utilized. Molding elements 49 directly into a rubber sheet can be used to orient and retain the magnetic components 49 while providing an environmental seal.

Figure 27:
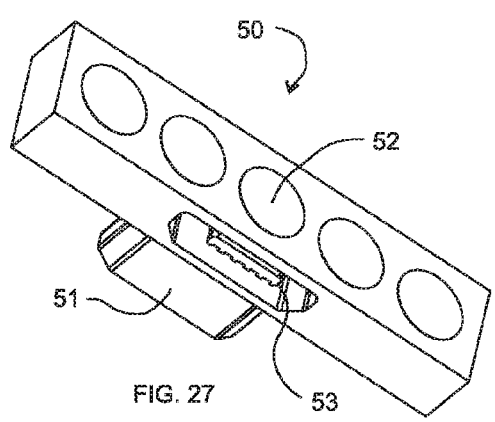
FIG. 27 is a front isometric view of an interposer connector incorporating an auxiliary conventional connector such as a micro-USB.
Figure 28:
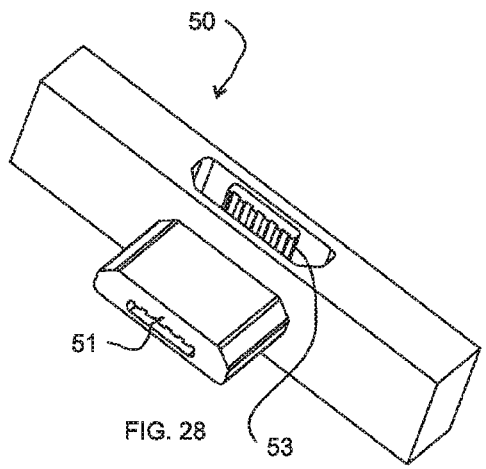
FIG. 28 is a rear isometric view of FIG. 27.

FIG. 27 and FIG. 28 illustrate a hybrid adapter including a combination of conventional connectors and a magnetic interposer connector 50. FIG. 27 is a front isometric view and FIG. 28 is a rear isometric view. In this example, the interposer 50 contains magnetic contacts 52 as described in embodiments herein, and incorporates a conventional standard connector 53 in a pass-thru configuration. For example, the interposer connector 51 to the device may be a male micro USB, and a similar female micro USB connector 53 for utilizing conventional accessory USB connectors. In this manner, the interposer may be semi-permanently left attached to the device while replicating the female jack of the device so that a cable can be attached as an alternative to using the magnetic connector. This saves "wear and tear" on the device connector while providing the flexibility of connecting through the standard connector or the magnetic connector of the interposer.

Figure 29:
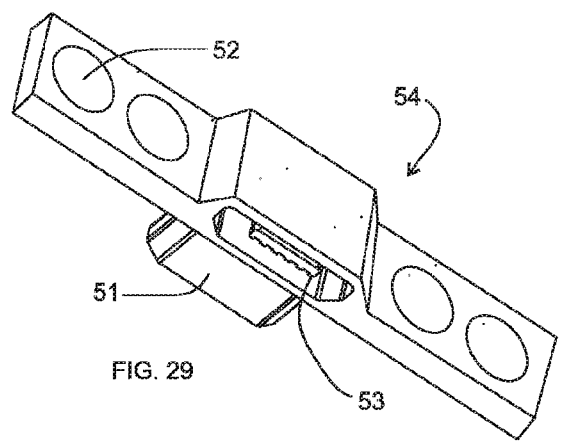
FIG. 29 is a front isometric view of another embodiment of interposer connector incorporating an auxiliary conventional connector such as a micro-USB.

FIG. 29 shows an example similar to FIG. 27, with four contacts 52 and a raised area around the conventional connector 53 to provide a lower volume overall design.

Figure 30:
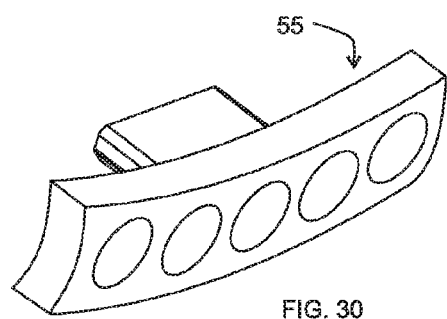
FIG. 30 is a front isometric view of an interposer illustrating compound curvature of the interposer surfaces.

The interposer connector structure does not need to be flat and can also be made flexible to conform to compound curved surfaces. FIG. 30 shows is an illustration of a compound curved interposer 55 suitable for blending with non-planar surfaces of devices.

FIG. 31 through FIG. 33 illustrate an example of an interposer connector 1 installed in device 9, installed into a case assembly 40 and mated with an accessory 11 such as a docking station. As illustrated, in FIG. 32, the size and shape of the accessory 11 approximates that of the case 40 in one orientation. This may assist in positioning the units together. A side connector 43 on the case may be used for an alternate orientation as shown in FIG. 33. Other passive (mechanical or optical) or active cues (electronic beep or display from device 9) may be used to provide feedback to the user for other geometries and examples.

FIG. 34 and FIG. 35 show an interposer, device and case with various magnetic connector/cable devices 56. Such cable devices may be constructed using similar methods described herein, with capabilities such as vertical stacking of multiple connector/cable devices 56, for example, using connector configurations similar to those shown in FIGS. 24 to 26.

FIG. 36 and FIG. 37 illustrate the use of accessory modules 57 with interposer, device and case. Such modules may contain functions such as, auxiliary batteries, memory, card-readers, games, key-fobs, etc. and may be magnetically and/or mechanically retained on the case via the magnetic connectors, and communicate with device 9 through the connectors, case electronics and interposer.

In the designs described, it is possible to utilize conventional spring electrical contacts, pogo pin electrical contacts, or other formed non-magnetic contacts in conjunction with the magnetic connectors and interposers. In the absence of magnetic attraction, some other external force will need to be employed to bring the contacts together. The use of the flexible magnetic interconnects provides a consistent self-attractive force which is independent of the number of discrete contact pairs using the structures disclosed herein.

Where permanent magnet elements are utilized, it is understood that various pole pieces, actuators or armature elements made from ferromagnetic material, and combined with the magnetic elements, may be used to tailor the mechanical contact interface and modify the magnetic flux path of the contacts and connector.

Figure 38:
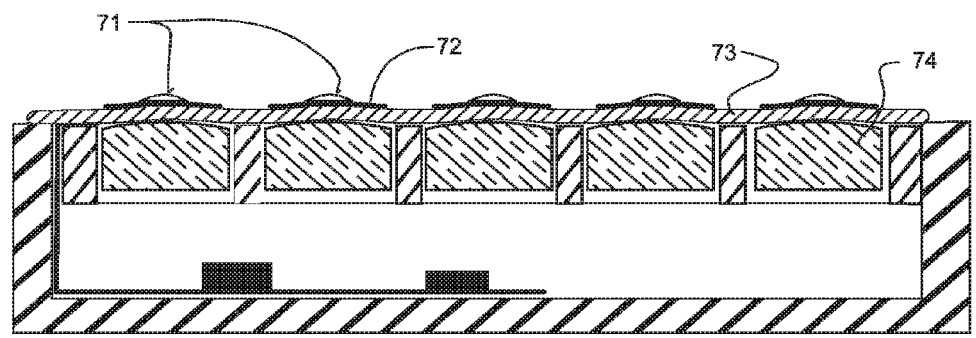
FIG. 38 is an embodiment of connector structure incorporating auxiliary attached contact pads that are rigid or semi-rigid.

Rigid or semi-rigid contact 71 structures may be attached to, or located adjacent to, the flexible components in a contact pair. FIG. 38 illustrates these rigid contact 71 additions added to the flexible circuit 73 that contains the electrical contact pads 72 (attached by methods such as soldering, conductive adhesives or mechanical means including but not limited to welds, rivets, bolts, crimps, or other permanent or removable fasteners.) As shown, one contact structure 71 has been attached to each of the contact pads in front of the permanent magnets 74 although they could be attached alternately or in addition to the contacts on the other mating connector half. Although the added contact structures may be rigid, they are attached to a compliant structure. As a result, they can be pushed or pulled in the direction of magnetic attraction by the loose magnetic structures on at least one half of the connection to absorb mechanical tolerance mismatches. That is, the compliant contact structure or the flexible substrate may deform around each rigid contact structure to provide motion perpendicular to the interface to widen mechanical tolerance capabilities in the physical contact to the mating electrical interface.

At a minimum, the outer surface of the contact structures 71 must be electrically conducting in order for electrical continuity. Providing a coating of copper, nickel, tin, silver or gold or forming the contact structure from one of these materials or their alloys allows the structures to be soldered to the contact pad. Use of a ferromagnetic material such as steel coated with one of these materials is preferred for magnetic flux and magnetic attractive force considerations. When a non-ferromagnetic material such as brass is used for these structures, the geometry of the structure can (like the ferromagnetic case) be configured to increase Hertzian stress. The non-magnetic contact structure 71 on the compliant substrate is only pushed toward the connector interface by the magnetic material behind it. However, the thickness of the non-ferromagnetic structure adds to the separation distance between the magnet on one side of the interface and the magnetic material opposite. This decreases the magnetic attractive force. However, when a ferromagnetic material is used, it acts as a pole piece that effectively extends the magnet length and concentrates the flux lines which may increase magnetic attraction. In this way, a contact structure 71 that is ferromagnetic may be considered to be both pushed and pulled toward the interface by participating in the magnetic flux circuit.

That is, ferromagnetic rigid contact structures attached to the flexible element may in this way form a pole piece coupled with a permanent magnet; for example, a steel (plated with passivating material such as nickel, gold) electrical contact feature may be soldered to a flexible circuit, with a permanent magnet located behind the flexible circuit. The steel contact point thus functions as a pole piece that may be attracted to another ferromagnetic or permanent magnet structure in the mating contact. The flexible contact structures, which generally are located adjacent to magnetic elements, or actuators, may be constructed with a variety of methods, such as flexible printed circuits, thin printed circuit boards, flexible conductive film overlays applied to substrates such as printed circuits, hybrid ceramic substrates, and molded interconnect devices; references cited above include examples of these and other example fabrication methods and designs.

Another embodiment in which ferromagnetic shaped actuators 76 direct and concentrate the magnetic flux lines and provide the electrical contact structure is illustrated in FIGS. 39-42. In the representative top exploded view of FIG. 39, one interposer connector half 75 has a single permanent bar magnet 77 with flexible circuitry 78 disposed on the north and south pole faces of magnet 77. Actuators 76 may be electrically connected to FPC contact pads 92 by magnetic force, soldering, conductive adhesives or mechanical means. Ferromagnetic actuators 76 are assembled to a non-magnetic housing 85 with apertures 88 that are configured to allow the actuator contacts to be inserted through frame 85 as shown in the assembled perspective view in FIG. 40. The actuator contacts 76 are electrically attached to actuator contact pads 92 of the FPC 78 which is attached to the magnet. As illustrated, the circuitry 83 is a flex circuit, but could be anything from discrete wires to a thin rigid printed circuit board. The actuators are preferentially coated with an electrically conductive coating as described above; the actuators 76 form the electrical circuit path from FPC circuitry 78 to the interposer connector interface contacts. The mating connector half 81 includes a housing 85 with apertures 89 aligned to those in housing 79, U-shaped ferromagnetic actuator contacts 82 and flexible circuitry 83 with actuator connection plated through mounting holes 84. Both connector half contacts may have complementary shaped contact surfaces 87 and 86 for aid in alignment, improved contact geometry, and decorative effects. The exposed contact faces may also be varied decorative and functional geometric shapes, letters, logos, etc. The actuators form the electrical path between flex circuit and the connector interface contacts, so a passivating conductive coating (such as gold over nickel plating) over the ferromagnetic base material of the actuators is advantageous. At least one side of the connector is designed such that the actuators are free to pivot and translate independently of the housing and each other to provide some self-aligning capability for mating and mechanical tolerance considerations. In addition, having the ends of mated pairs of actuators extendable beyond the interface surface of the frame may assist in making connections without visual feedback or guiding structures. FIGS. 41 and 42 represent the same interposer electrical connector system as FIGS. 39 and 40, but from a different perspective to show both connector halves more clearly.

Figure 43:
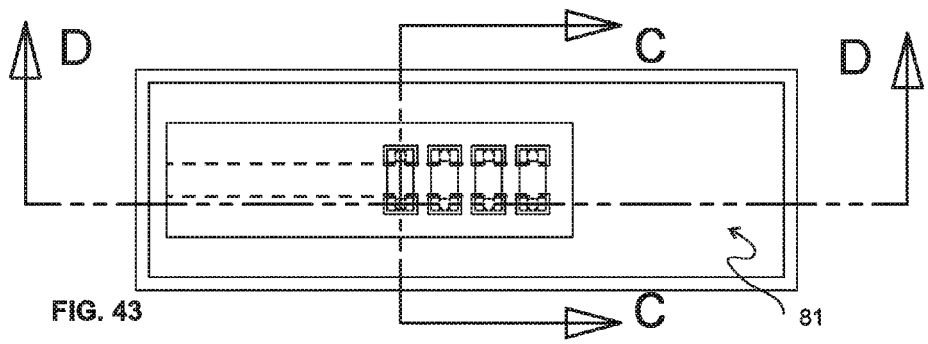
FIG. 43 is a top view of the mated connectors of FIG. 39 through FIG. 42, indicating sectional drawing cut locations.
Figure 44:
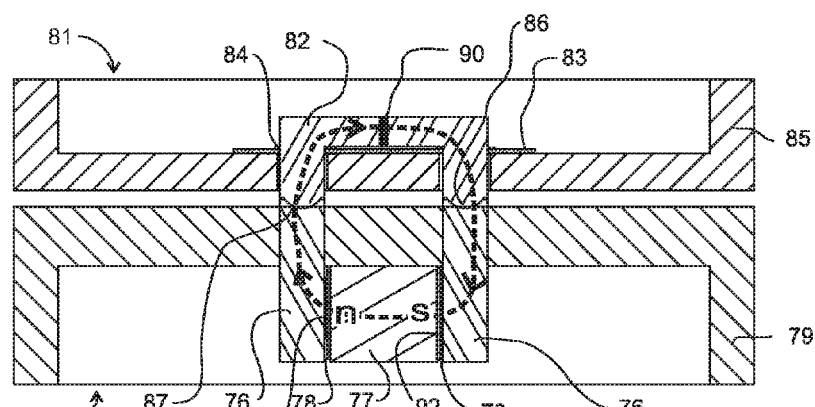
FIG. 44 is a cross-sectional view C-C of FIG. 43.

FIG. 43 illustrates a top view of FIG. 42 with cross-section indicators C-C and D-D of a mated connector pair. FIG. 44 along section C-C shows the magnetic flux path that travels from the magnet 77, through actuator contact 76 to the contact point 87, from the contact 86 to one leg of the u-shaped actuator 82 across to the other actuator leg to the second contact point, from the second contact point 87 of actuator contact 76 through the second actuator 76 back to the magnet. The bar magnet 77 has its magnetic poles oriented across the axis of the bar and substantially parallel to the connector electrical interface. The actuator contacts 82 as shown in FIG. 39 are of unitary construction, so the contacts on both legs will be electrically connected. FIG. 44 includes an electrically insulating barrier 90 in a composite U-shaped actuator structure that may be used to separate these contacts electrically. Since electrical isolation can be accomplished in a very thin insulating barrier, the magnetic flux circuit is not appreciably impacted by including this thin electrical insulator. Similarly, the magnet may be electrically insulated from the actuator contacts with a thin insulating layer, but in general the FPC would insulate the magnet from the actuators. Insulating the actuators allows for discrete electrical paths for each mated contact.

Figure 45:
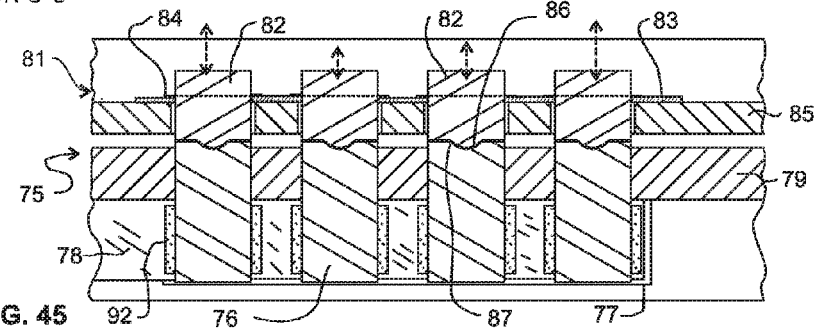
FIG. 45 is a cross-sectional view D-D of FIG. 43.

FIG. 45 along section D-D illustrates representative mated contact pairs of connector assembly halves 81 and 82. In this example the side-b connector 81 actuator contacts 82 are free to move within the housing for self-adjusting alignment.

Figure 46:
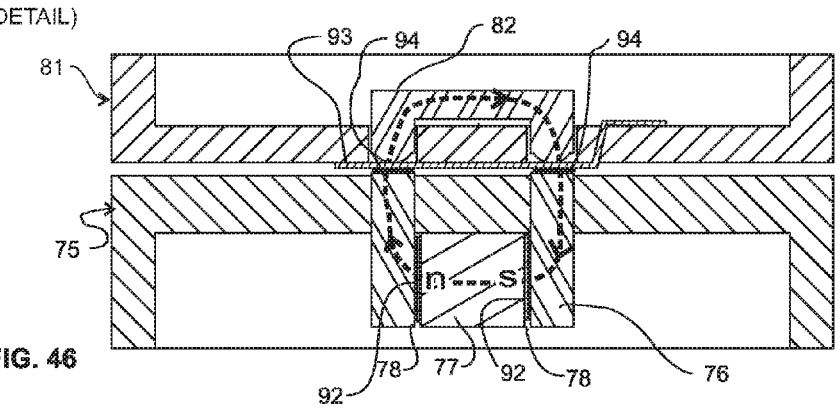
FIG. 46 is another embodiment of magnetic connector similar to FIG. 39 that utilizes an exterior FPC on one connector half, and u-shaped ferromagnetic actuator.

This embodiment provides multiple interposer connections with a single bar magnet on only one half of the connector system. The ferromagnetic actuator contacts on both sides preferentially direct the magnetic flux lines to be concentrated at the electrical connector interface contact points using the actuators as part of the electrical circuit path. In these embodiments, a line may be drawn through a mated contact pair substantially perpendicular to the connector electrical interface that passes through magnetic material located in both connector halves. The magnetic flux management described herein is compatible with variations in both ferromagnetic actuator design and electrical path. For example, FIG. 46 is a cross-sectional view that illustrates flexible circuit 93 with compliant contacts 94 in connector half 81 as an alternative that bypasses electrical conduction through the ferromagnetic actuators 82. In this form, the magnetic attractive force presses the compliant contact against the contact points of actuators 76.

Figure 47:
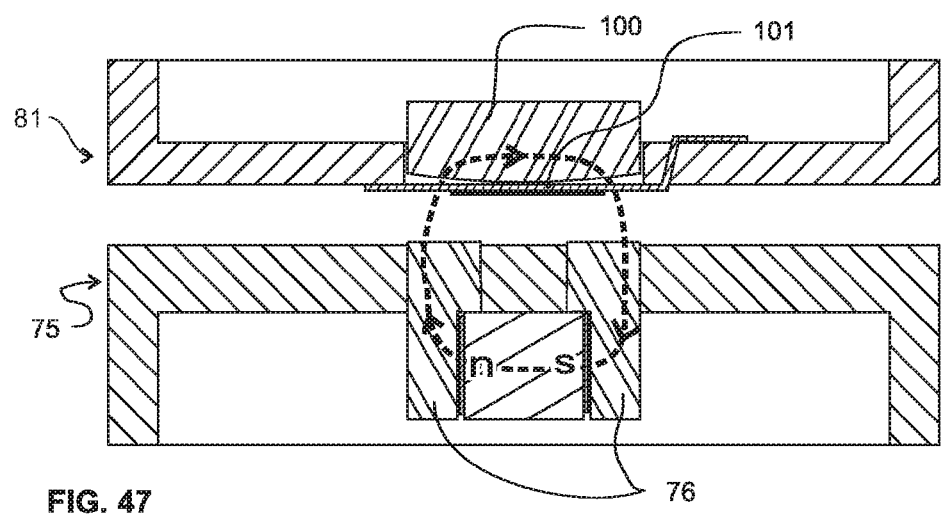
FIG. 47 is another embodiment of magnetic connector similar to FIG. 39 and FIG. 46 that utilizes an exterior FPC on one connector half with a bridging movable ferromagnetic actuator.
Figure 48:
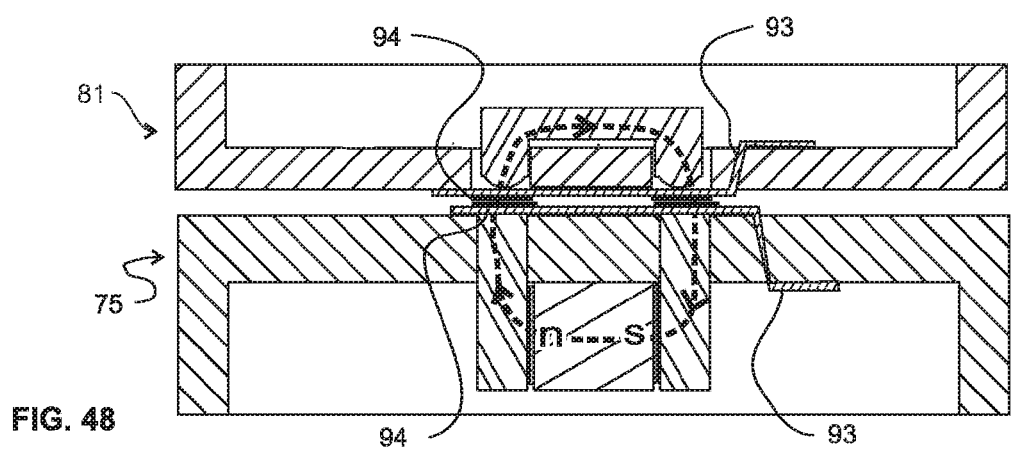
FIG. 48 is another embodiment of magnetic connector similar to FIG. 46 and FIG. 47 that utilizes an exterior FPC on both connector halves, and u-shaped movable ferromagnetic actuator in one connector half.

FIG. 47 illustrates a ferromagnetic structure 100 that is located behind a compliant contact 101 centered on the interface which provides essentially the same magnetic flux path and spans the contact points of both actuators 76 in connector half 75. FIG. 48 does not require electrical conduction through ferromagnetic actuators in both sides of the interface by using electrical contacts on the surfaces of the interface halves that are compressed by the magnetic force. As illustrated, the contacts on the flexible circuitry 93 of connector half 81 are compliant and actuator contacts are shaped to provide reliable electrical connections under a wider range of mechanical tolerance and operating conditions.

Figure 49:
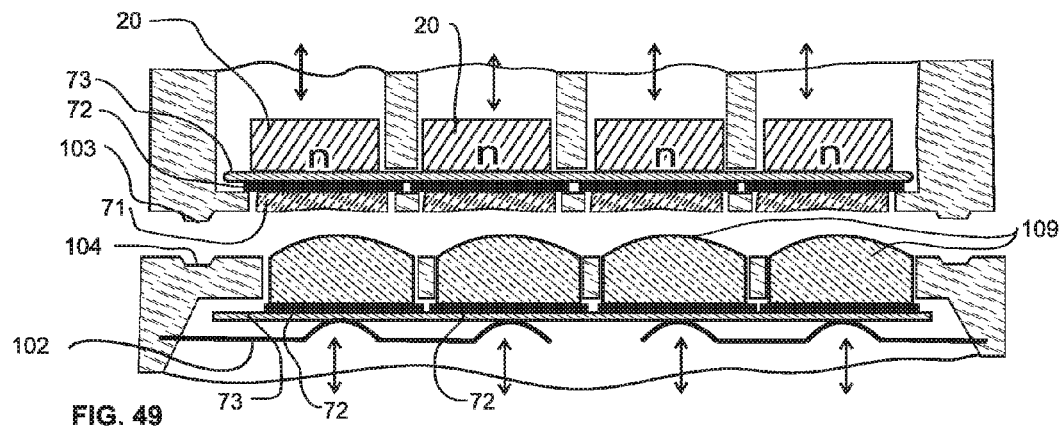
FIG. 49 is a cross-sectional view of an embodiment of connector utilizing compliant spring-loaded ferromagnetic actuators attached to an FPC on one connector half, and permanent magnet actuators with auxiliary contact pads attached to an FPC on the mating connector half.
Figure 50:
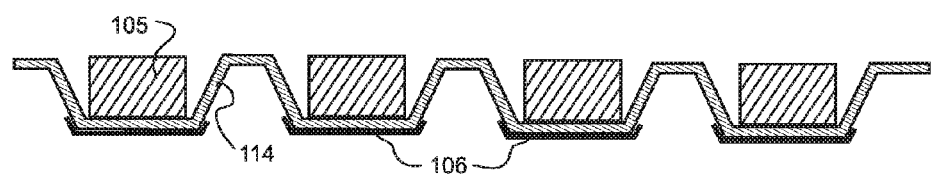
FIG. 50 is a cross-sectional view of a partial connector structure illustrating a formed 3-dimensional FPC.
Figure 51:
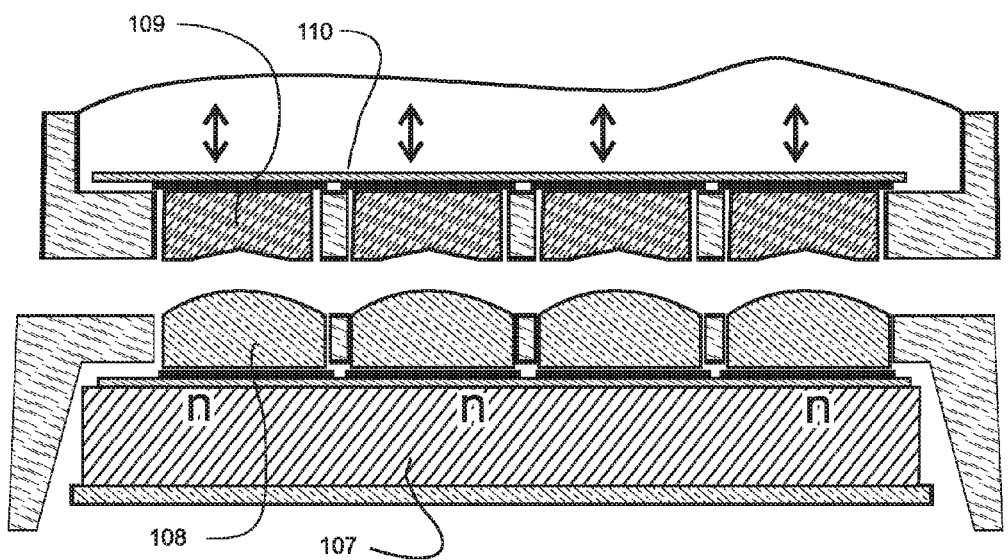
FIG. 51 is a cross-sectional view of a connector structure illustrating movable ferromagnetic contact pads attached to an FPC on one side of the connector, and ferromagnetic fixed pole piece contacts with a single-piece permanent magnet in the mating connector.

FIGS. 49-51 illustrate some other combinations of features that may be configured for use with embodiments above. FIG. 49 includes rigid contact structures 71 described earlier. In this case, the surfaces of the contact structures 71 are shaped to match the surfaces of the discrete ferromagnetic contacts 109 on the other side. Although the magnets 20 do not participate in electrical conduction, the contact structures 71 and ferromagnetic elements 109 provide the electrical path between flex circuitry on both halves of the connectors. As a result, the contact structures and ferromagnetic elements need to be electrically conducting. Note that the ferromagnetic structures illustrated form the electrical interface portion that mates with the electrical interface of the other connector half. That is, the ferromagnetic structures are still proximate with the contacts and the electrical interface, but they are located on the opposite side of the flexible substrate than the illustrations of previous embodiments. Spring members 102 may be included to provide contact biasing force behind the ferromagnetic elements if desired in a particular application. Foams or other resilient materials can be substituted to provide this mechanical biasing. Additional compliancy in this direction along with the complimentary shapes of the contact structures and ferromagnetic element contacts may be employed to help guide the connector halves along a path where other alignment features 103 may engage. Arrows are used to schematically indicate the primary direction of possible movement of elements to tolerate connector electrical interface mechanical mismatch.

FIG. 50 illustrates a flexible circuit 114 that is not planar, but intentionally formed. In this case, the support for the wiring and contact pads may be applied to a substrate such as Mylar or other thermoplastic that is formed prior to or after circuitization. Magnetic materials 105 may be positioned within formed structures of the substrate behind the formed electrical contact pads 106. The cross-sectional structure illustrated allows flexing in at least one direction. In general, the contacts can be movable in multiple directions by controlling the shape of the formed member and/or by cutting or removing substrate material to increase flexibility as desired through known stress release design techniques. The shape of the electrical contact points may also be formed to increase Hertzian stress. Structures of this form may be employed, for example, to orient and contain small magnetic elements in variations of the embodiments above.

FIG. 51 includes an extended magnet 107 behind ferromagnetic structures 108 that act as pole extensions and that are fixed in position along the electrical interface of this half of the connector system. The mating connector half illustrated includes discrete ferromagnetic contact structures 109 mounted on compliant circuitry 110. Variations of this embodiment may also remove the ferromagnetic components from one of the connector halves such that a ferromagnetic component directly connects to FPC contact pads. As was the case above in FIG. 49, the ferromagnetic structures on both sides participate in electrical conduction.

Although connector structures with linear arrays are primarily used herein for illustration, an unlimited variety of connector contact configurations are possible, including but not limited to linear arrays, x-y area arrays, "bulls eye" rotatable contacts, and non-planar connectors. Many other variations of individual elements of the above embodiments or different combinations of these elements are possible and are considered to be included in the disclosure and enablement of practicing the inventive concepts.

What is claimed is:

1. An electrical connector system comprising:
   a first connector, the first connector comprising:
      a housing;
      one or more first electrical contact surfaces;
      a compliant substrate;
      a first magnetic structure affixed to the compliant substrate wherein the first magnetic structure comprises
         a permanent magnet characterized by a first and a second magnetic pole;
         a first ferromagnetic structure wherein a portion of the first ferromagnetic structure is disposed proximate the first magnetic pole and a portion of the first ferromagnetic structure is disposed proximate a first electrical contact surface;
         a second ferromagnetic structure wherein a portion of the second ferromagnetic structure is disposed proximate the second magnetic pole and a portion of the second ferromagnetic structure is disposed proximate a first electrical contact surface; and
   wherein the first magnetic structure is adapted to pivot and translate relative to the housing under magnetic forces.

2. The electrical connector system of claim 1 further comprising:
   a second connector, the second connector comprising:
   a second magnetic structure wherein the first magnetic structure is magnetically attracted to the second magnetic structure when the first connector is brought in close proximity to the second connector;
   a second electrical contact surface disposed proximate the second magnetic structure,
   wherein the first electrical contact surface is configured to be pressed against the second electrical contact surface by the magnetic attraction between the first and second magnetic structures.

3. The electrical connector system of claim 1 wherein the compliant substrate includes a compliant substrate aperture and wherein the first ferromagnetic structure extends through the compliant substrate aperture and wherein the first ferromagnetic structure is electrically connected to the compliant substrate.

4. The electrical connector system of claim 1 comprising housing sealing means wherein the housing sealing means includes at least one of:
   covering a portion of the housing with a portion of the compliant substrate; and
   embedding a portion of the first ferromagnetic structure into a flexible portion of the housing wherein said flexible portion of the housing comprises a flexible material.

5. The electrical connector system of claim 1 wherein the first contact surface is an electrically conducting portion of the compliant substrate.

6. The electrical connector system of claim 1 wherein the housing contains a housing aperture and wherein a portion of the first ferromagnetic structure extends into the housing aperture.

7. The electrical connector system of claim 6 further comprising a rigid contact wherein the rigid contact is affixed to the compliant substrate proximate the first ferromagnetic structure.

8. The electrical connector system of claim 7 wherein the rigid contact structure comprises asperities.

9. An electrical connector system comprising:
a first connector electrical interface comprising:
  a housing including one or more housing apertures;
  a flexible circuit;
  a first magnetic element affixed to the flexible circuit, wherein the first magnetic element comprises
    a permanent magnet characterized by first and second magnetic poles;
  a first ferromagnetic actuator, wherein the first ferromagnetic actuator is disposed proximate the first magnetic pole and extends into a housing aperture;
  a second ferromagnetic actuator wherein the second ferromagnetic actuator is disposed proximate the second magnetic pole and extends into a housing aperture;
  one or more first electrical contacts disposed along the first connector electrical interface proximate the first and second ferromagnetic actuators;
a second connector electrical interface comprising:
  a second magnetic element;
  one or more second electrical contacts disposed along the second connector electrical interface;
  wherein the electrical connector system is configured to provide electrical continuity between at least one first electrical contact and at least one second electrical contact through magnetic attraction of the first connector electrical interface to the second connector electrical interface.

10. The electrical connector system of claim 9 wherein the first magnetic structure moves relative to the housing under magnetic forces when the first connector electrical interface is moved relative to the second connector electrical interface.

11. The electrical connector system of claim 9 wherein a first electrical contact is in electrical continuity with the first ferromagnetic actuator.

12. The electrical connector system of claim 9 wherein electrical continuity between the first connector electrical interface and the second connector electrical interface results from at least one of
touching of first and second electrical contacts proximate the first ferromagnetic actuator; and
touching of first and second electrical contacts proximate the second ferromagnetic actuator.

13. The electrical connector system of claim 9 wherein a cross-section perpendicular to the first connector electrical interface through the first and second ferromagnetic actuators is characterized by a magnetic flux path that is directed from the first magnetic pole through the magnet to the second magnetic pole, through the second ferromagnetic actuator, up through a point of touching of a first electrical contact and a second electrical contact, through the second magnetic element, down through a point of touching of a second electrical contact and a first electrical contact wherein the down direction is substantially the opposite of the up direction, and through the first ferromagnetic actuator to the first magnetic pole.

14. The electrical connector system of claim 13 wherein the second magnetic element comprises ferromagnetic material that is at least as long as the first magnetic element in the direction along the mated first and second electrical interfaces.

15. The electrical connector system of claim 13 wherein the at least one second electrical contact spans the point of touching of the first and second electrical contacts proximate the first ferromagnetic actuator and the point of touching of the second and first electrical contacts proximate the second ferromagnetic actuator to include magnetic flux lines directed in both up and down directions through the second electrical contact.

16. An electrical connector system comprising:
a first connector, said first connector comprising:
  a first connector housing having a first connector mating interface;
  one or more first electrical contacts disposed along the first connector mating interface;
  a compliant substrate; and
  a first magnetic structure affixed to the compliant substrate, wherein the first magnetic structure comprises:
    a magnet having a first pole face and a second pole face; and
    a first ferromagnetic actuator wherein the first ferromagnetic structure is not a source of magnetic flux, wherein the first ferromagnetic actuator is positioned proximate the first pole face of the magnet, and wherein the first ferromagnetic actuator directs magnetic flux through a first electrical contact in a direction substantially perpendicular to the first connector mating interface;
    a second ferromagnetic actuator wherein the second ferromagnetic structure is not a source of magnetic flux, wherein the second ferromagnetic actuator is positioned proximate the second pole face of the magnet and wherein the second ferromagnetic actuator directs magnetic flux through a first electrical contact in a direction substantially perpendicular to the first connector mating interface;
a second connector, said second connector comprising:
  a second connector mating interface;
  a second electrical contact disposed along the second connector mating interface; and
  a third ferromagnetic actuator wherein a portion of the third ferromagnetic actuator is positioned behind the second electrical contact; and wherein magnetic attraction moves at least one of the first ferromagnetic actuator and the third ferromagnetic actuator relative to the first connector housing as the first connector mating interface approaches the second connector mating interface.

17. The electrical connector system of claim 16 wherein a portion of the first connector housing limits motion of the magnet toward the first connector mating interface.

18. The electrical connector system of claim 16 wherein at least one of the first or second electrical contacts includes a curved surface portion.

19. The electrical connector system of claim 16 wherein at least one of the first, second or third ferromagnetic actuators is shaped to concentrate magnetic flux density characterized by a reduction in cross-sectional extent in a direction toward the position where a first electrical contact is pressed against a second electrical contact when the first connector mating interface is mated to the second connector mating interface.

20. The electrical connector system of claim 16 wherein a portion of the compliant substrate extends through the first connector housing to provide electrical continuity from a first electrical contact to the interior of the first connector housing.

\* \* \* \* \*